United States Patent [19]
Ota

[11] Patent Number: 5,757,533
[45] Date of Patent: May 26, 1998

[54] SCANNING LENS AND OPTICAL SCANNER USING THE SAME

[75] Inventor: Akira Ota, Saitama, Japan

[73] Assignee: Fuji Xerox Co., LTD., Tokyo, Japan

[21] Appl. No.: 778,638

[22] Filed: Jan. 3, 1997

Related U.S. Application Data

[62] Division of Ser. No. 325,530, Oct. 19, 1994, Pat. No. 5,619,362.

[30] Foreign Application Priority Data

Dec. 17, 1993 [JP] Japan .................. 5-318763

[51] Int. Cl.$^6$ ............................... G02B 26/08
[52] U.S. Cl. .................. 359/205; 359/206; 359/207; 359/216; 359/217
[58] Field of Search .................. 359/205–207, 359/216–219, 662, 708, 711, 718; 347/258–261; 250/234–236

[56] References Cited

U.S. PATENT DOCUMENTS

| | | | |
|---|---|---|---|
| 4,447,112 | 5/1984 | Matsuoka et al. | 359/207 |
| 4,799,747 | 1/1989 | Yamakawa . | |
| 4,915,484 | 4/1990 | Yamamoto | 359/217 |
| 4,962,982 | 10/1990 | Takanashi . | |
| 5,136,416 | 8/1992 | Shiraishi | 359/217 |

FOREIGN PATENT DOCUMENTS

| | | | |
|---|---|---|---|
| 242120 | 10/1987 | European Pat. Off. | 359/207 |
| 57-144518 | 9/1982 | Japan . | |
| 62-138823 | 6/1987 | Japan . | |
| 63-50812 | 3/1988 | Japan . | |
| 63-142317 | 6/1988 | Japan . | |
| 1-38709 | 5/1989 | Japan . | |
| 3-55513 | 3/1991 | Japan . | |
| 4-50908 | 2/1992 | Japan . | |
| 4-104213 | 4/1992 | Japan . | |
| 5-45580 | 2/1993 | Japan . | |

*Primary Examiner*—James Phan
*Attorney, Agent, or Firm*—Finnegan, Henderson, Farabow, Garrett & Dunner, L.L.P.

[57] ABSTRACT

An optical scanner including a semiconductor laser device, aperture, collimator, cylindrical lens, polygonal mirror and one fθ lens element molded from plastics. The first surface of the fθ lens in a deflecting plane (or the plane formed by the principal rays of light as deflected by the polygonal mirror) is aspheric whereas the second lens surface is toric. When taken in the deflecting plane, the first lens surface has a positive value of the near-axis radius of curvature and, hence, it is convex toward the polygonal mirror. Taken in a plane crossing the deflecting plane at right angles, the first lens surface forms an arc of a circle having a negative value of the radius of curvature and, hence, it is concave toward the polygonal mirror. When taken in the deflecting plane, the second lens surface forms an arc of a circle having a negative value of the radius of curvature and, hence, it is convex toward the scanning surface.

3 Claims, 28 Drawing Sheets

SCANNING LENS AND OPTICAL SCANNER USING THE SAME

This is a division of application Ser. No. 08/325,530, filed Oct. 19, 1994 and issued Oct. 8, 1996, now U.S. Pat. No. 5,619,362.

BACKGROUND OF THE INVENTION

1. Field of the Invention

The present invention relates to a scanning lens and an optical scanner that uses it. More particularly, the invention relates to a single-element scanning lens for use as an fθ lens in laser scanning optics, as well as an optical scanner equipped with this scanning lens.

2. Description of the Related Art

Optical scanners are extensively used with optical printers, digital copiers and the like. Such optical scanners employ a deflector such as a polygonal mirror for deflecting incident light at a constant angular velocity in a direction corresponding to the main scanning direction, and an fθ lens as a scanning lens. The fθ lens has two functions; according to one function, a laser beam that issues typically from a semiconductor laser device and which has been deflected by the deflector is focused as a spot on a scanning surface such as a photoreceptor drum or belt and the other function is to move the beam spot over the scanning surface at a constant speed.

In most cases, the fθ lens is provided with the capability by which the position of a deflecting point on the deflector and the position of a beam spot on the scanning surface are rendered to satisfy a conjugated relationship in a plane crossing at right angles with the plane formed by the deflected laser beam. A cylindrical lens is positioned on the side of the deflector where the laser beam is launched and it has a lens power in a direction corresponding to the sub-scanning direction. The fθ lens combines with this cylindrical lens to constitute tilt-correcting optics which corrects optically any inclination of reflecting surfaces of the deflector and which is capable of producing a substantially circular beam spot.

Many of the commercial Fθ lenses available today are optics that are composed of two or more lens elements but they suffer from the disadvantage of complexity in construction. To solve this problem, fθ lenses composed of only one lens element have been proposed as simple optics.

Japanese Patent Unexamined Publication Nos. Sho. 57-144518, Sho. 63-50812 and Hei. 3-55513 teach one-element Fθ lenses having a toric surface on one side and a spherical, cylindrical or toric surface on the other side. Japanese Patent Unexamined Publication Nos. Sho. 62-138823, Hei. 4-50908 and Hei. 5-45580 teach fθ lenses having an aspheric surface.

However, the conventional fθ lenses have their own problems. The fθ lens described in Japanese Patent Unexamined Publication No. Sho. 57-144518 which is solely composed of toric surfaces provides no better performance than a single spherical lens element when compared on the main scanning surface and, hence, it suffers from the disadvantage of small latitude in design, limited extent to which imaging performance can be insured in terms of Fθ characteristics and curvature of field, and the resulting failure to achieve high image resolution. If one strains to assure satisfactory imaging performance, the center thickness of the lens has to be increased as described in Japanese Patent Unexamined Publication Nos. Sho. 63-50812 and Hei. 3-55513 but this only results in increased difficulty in lens manufacture.

With a view to eliminating these drawbacks, Japanese Patent Unexamined Publication Nos. Sho. 62-138823 and Hei. 4-50908 have proposed Fθ lenses that adopt an aspheric surface in order to provide improved imaging performance. However, these fθ lenses are so complex in shape as to have no rotating axis and, hence, they are very difficult to design and manufacture. The fθ lens described in Japanese Patent Unexamined Publication No. Hei. 5-45580 is such that a cross-sectional shape taken in the main scanning direction is of a meniscus convex to the scanning surface and it adopts an aspheric surface having a rotating axis. However, light condensing optics must be provided on the side of a tenon-shaped mirror (deflector) where incident light is launched. In addition, the fθ characteristics of the lens are substantially associated with constant speed and electrical correction must be made to achieve linearity but, then, the overall equipment becomes complicated and costly.

SUMMARY OF THE INVENTION

The present invention has been accomplished under these circumstances and has an object to provide a one-element scanning lens that adopts a simple enough shape to assure not only high performance but also ease in design and manufacture.

Another object of the invention is to provide an optical scanner using such scanning lens.

To achieve the first object, the invention provides a scanning lens which is a single lens element that is positioned between deflecting means for deflecting an incident light beam in a predetermined direction at a constant angular velocity and a scanning surface and which converges the incident light beam in such a way that a beam spot is scanned at a constant speed, the scanning lens including: a first lens surface having a rotating axis that is located in a deflecting plane formed by principal rays of light beam deflected by the deflecting means and which crosses an optical axis of the scanning lens at right angles, wherein a curve the first lens surface forms by crossing the deflecting plane is convex toward the deflecting means in the neighborhood of the optical axis and wherein an arc of a circle the first lens surface forms by crossing a plane crossing the deflecting plane at right angles is formed of an aspheric surface convex toward the scanning Surface; and a second lens surface having a rotating axis that is located in the plane crossing the deflecting plane at right angles and which crosses the optical axis at right angles, wherein arcs of circles the second lens surface forms by crossing the deflecting plane and the plane crossing the deflecting plane at right angles form a toric surface convex toward the scanning surface, wherein the first and second lens surfaces satisfy the following conditions:

$$R1M/R2M < -1$$

$$R1S/R2S > 1$$

$$-0.9 < R2M/f < -0.55$$

$$-0.16 < R2S/f < -0.08$$

where R1M is a near-axis radius of curvature of the aspheric lens surface, R1S is a radius of curvature of an arc of a circle of the aspheric lens surface in the plane crossing the deflecting plane at right angles, R2M is a radius of curvature of an arc of a circle of the toric lens surface in the deflecting plane, R2S is a radius of curvature of an arc of a circle of the toric lens surface in the plane crossing the deflecting plane at right angles, and f is a focal length of the scanning lens in the deflecting plane, provided that the sign of radius of curvature is positive when the curvature is convex in a direction in which the incident light beam is launched and negative when it is convex in a direction in which the incident light beam travels.

To achieve the second object, the invention provides an optical scanner including: collimating means for converting a light beam from a light source to substantially parallel rays; imaging means for permitting the parallel rays to form a line image elongated in a direction corresponding to a main scanning direction; deflecting means that has a reflecting surface either in a position where the line image forms or in the neighborhood of the position and which deflects the incident light beam at a constant angular velocity in the direction corresponding to the main scanning direction; and a single scanning lens element that is positioned between the deflecting means and a scanning surface, a lens surface directed toward the deflecting means being such that it has a rotating axis that is located in a deflecting plane formed by the principal rays of light beam defected by the deflecting means and which crosses the optical axis of the scanning lens at right angles, wherein a curve the lens surface forms by crossing the deflecting plane is convex toward the deflecting means in the neighborhood of the optical axis and wherein an arc of a circle the lens surface forms by crossing a plane crossing the deflecting plane at right angles is formed of an aspheric surface convex toward the scanning surface, and a lens surface directed toward the scanning surface being such that it has a rotating axis that is located in the plane crossing the deflecting plane at right angles and which crosses the optical axis at right angles and wherein arcs of circles the lens surface forms by crossing the deflecting plane and the plane crossing the deflecting plane at right angles form a toric surface convex toward the scanning surface.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

Hereinafter, embodiments of the invention will be described in detail with reference to the accompanying drawings.

Figure 4:
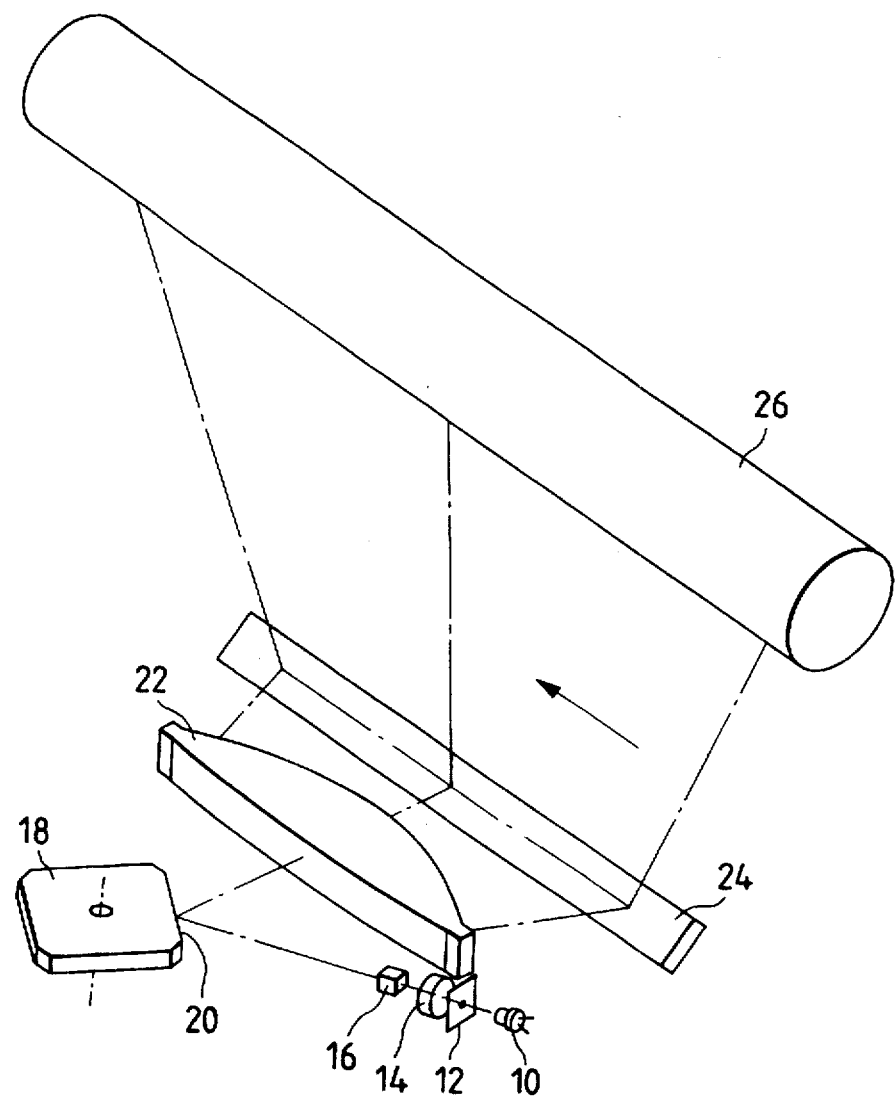
FIG. 4 is a perspective view of an optical scanner using the Fθ lens of Embodiment 1.

As shown schematically in FIG. 4, an optical scanner of Embodiment 1 of the invention has a semiconductor laser device 10 as a light source and an aperture 12 and a collimator 14 for shaping the light beam from the semiconductor laser device 10 to parallel rays are arranged in that order on the side of the laser 10 from which laser beam issues. A cylindrical lens 16 is positioned on the side of the collimator 14 from which the collimated laser beam emerges. The cylindrical lens 16 has a lens power in a direction corresponding to the sub-scanning direction and permits the collimated laser beam to form a line image elongated in a direction corresponding to the main scanning direction (indicated by an arrow). A polygonal mirror 18 which reflects the incident laser beam and deflects it at a constant angular velocity in a direction corresponding to the main scanning direction is positioned in such a way that a reflecting surface 20 will coincide either with the position where the line image forms or with a nearby area. An Fθ lens 22 which is a single scanning lens element formed of plastic amorphous polyolefin is provided on the side of the polygonal mirror 18 from which the reflected laser beam emerges. The fθ lens 22 converges the reflected laser beam in such a way that a substantially circular beam spot is scanned at a constant speed over the surface of a photoreceptor drum 26 which serves as a scanning surface. For an installation-related reason, a reflector mirror 24 with which the laser beam issuing from the Fθ lens 22 is reflected towards the photoreceptor drum 26 is provided between the two components.

In the embodiment under consideration, the cylindrical lens 16 is positioned on the entrance side of the polygonal mirror 18 to constitute pre-polygonal optics and this mirror focuses the light beam from the semiconductor laser device 10 in such a way that a line image elongated in a direction corresponding to the main scanning direction is formed on the reflecting surface 20. The laser beam is then deflected by the polygonal mirror 18 at a constant angular velocity in a direction corresponding to the main scanning direction and subsequently launched into the fθ lens 22, which performs scanning over the photoreceptor drum 26 in the main scanning direction at a constant speed. The Fθ lens 22 also performs anti-tilt correction to correct any uneven pitches in the sub-scanning direction. The cylindrical lens 16 also works to form a substantially circular beam spot on the photoreceptor drum 26.

Figure 1A:
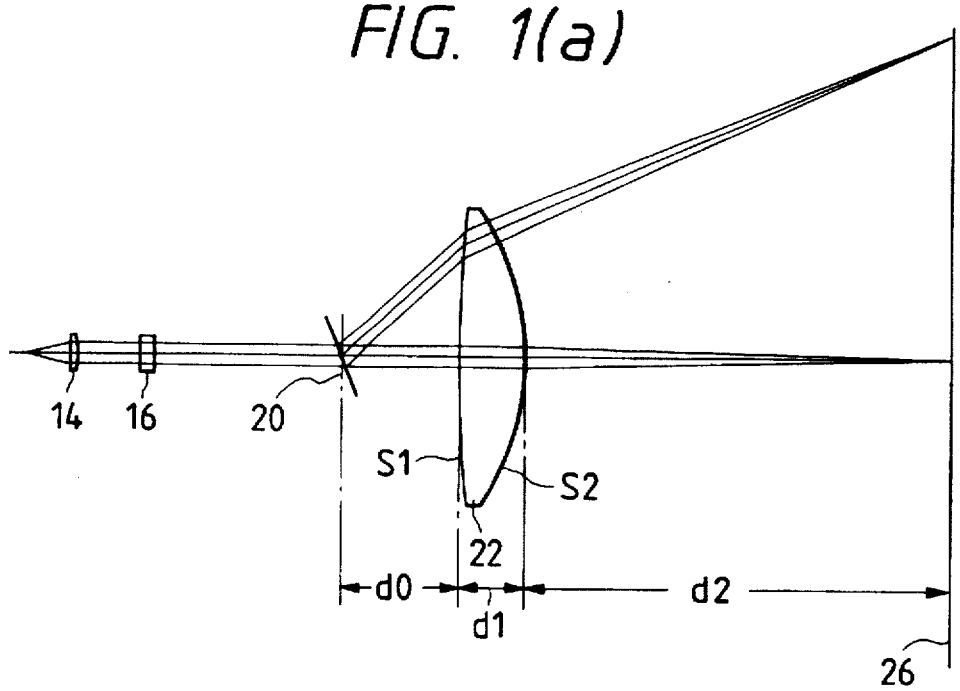
FIG. 1(a) is a simplified cross-sectional view showing the shape of an Fθ lens of Embodiment 1 as it is cut across the deflecting plane.
Figure 1B:
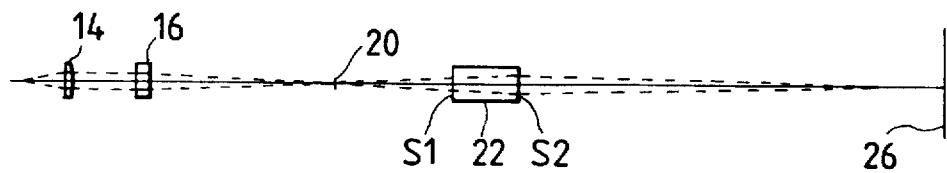
FIG. 1(b) is a simplified cross-sectional view of the shape of the Fθ lens as it is cut across a plane crossing the deflecting plane at right angles.

FIG. 1(a) shows the shapes of individual lenses in the deflecting plane of the Fθ lens 22 (or the plane which the principal rays of laser beam deflected by polygonal mirror 18 will form) and FIG. 1(b) shows the lens shapes in a plane crossing the deflecting plane at right angles (or the plane that includes the optical axis of the Fθ lens 22 and which crosses the deflecting plane at right angles). The lens surface S1 of the fθ lens 22 which is directed towards the polygonal mirror 18 (or deflecting means) is aspheric whereas the surface S2 directed towards the photoreceptor drum 26 (or scanning surface) is toric.

Figure 2:
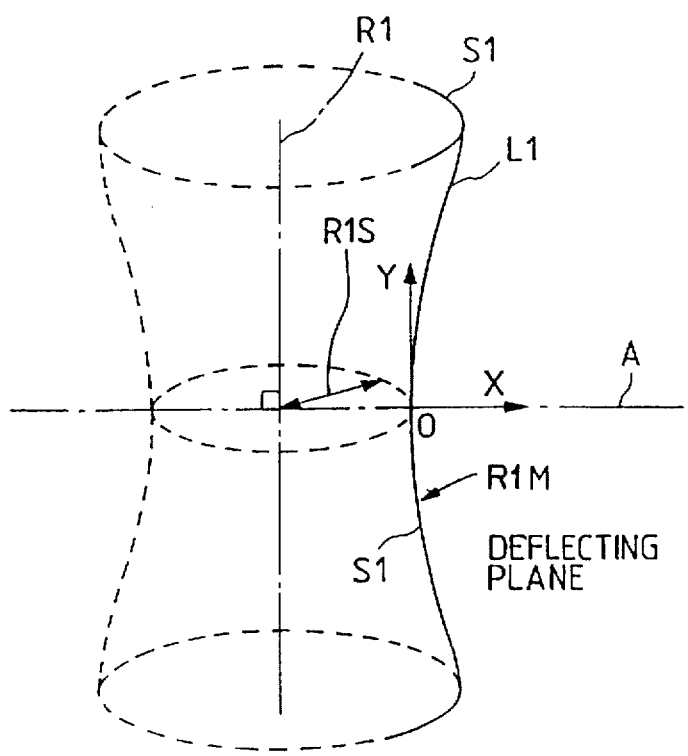
FIG. 2 is an illustration of the shape of the surface of the fθ lens of Embodiment 1 which is directed toward a polygonal mirror.

As shown in FIG. 2, the aspheric lens surface S1 is produced by rotating the curve L1 expressed by the following equation (1) about the axis R1 which is a straight line in the deflecting plane and parallel to the y-axis of an assumed xy plane in the deflecting plane that has as the origin the point O of intersection between the optical axis A and the lens surface S1 and which has the x-axis extending along the optical axis A:

$$x = y^2/\{R1M + \sqrt{R1M^2 - (1+K)y^2}\} + Ay^4 + By^6 + Cy^8 + Dy^{10} \quad (1)$$

where R1M is a near-axis radius of curvature of the aspheric lens surface, K is a conic constant, and A, B, C and D are aspheric coefficients of higher orders.

Hence, when taken in the deflecting plane, the lens surface S1 is convex toward the polygonal mirror 18 since R1M, or its near-axis radius of curvature is positive (the sign of radius of curvature is assumed to be positive for the distance measured in the direction in which the incident laser beam is launched or approaches, and negative for the distance measured in the direction in which the incident laser beam travels); on the other hand, when taken in the plane crossing the deflecting plane at right angles, the lens surface S1 is concave toward the polygonal mirror 18 or convex toward the photoreceptor drum since it forms an arc of a circle with R1S, or its radius of curvature in the plane crossing the deflecting plane at right angles, being negative. The radius of curvature R1S corresponds to the distance between the rotating axis R1 and the lens surface S1 in the axial direction.

Figure 3:
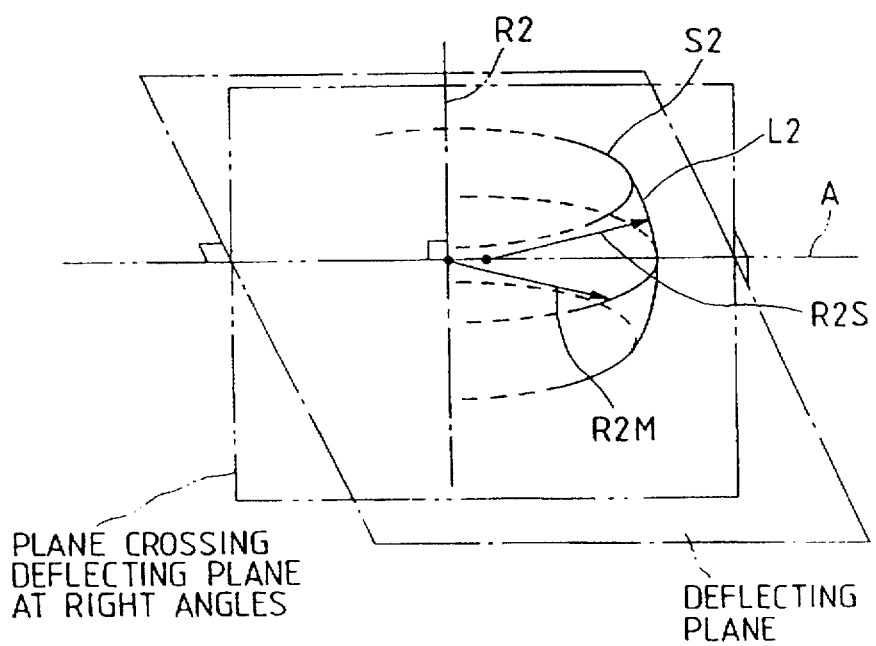
FIG. 3 is an illustration of the shape of the surface of the fθ lens of Embodiment 1 which is directed toward a photoreceptor drum.

As shown in FIG. 3, the toric lens surface S2 is produced by rotating the arc L2 of a circle, having the radius of curvature R2S and located in the plane crossing the deflecting plane at right angles, about the axis R2 that is a straight line in the plane crossing the deflecting plane at right angles, that crosses the optical axis A at right angles and which is apart from the arc L2 of a circle by the distance R2M. Therefore, the lens surface 52 is such a toric surface that the arcs of circles in the deflecting plane and in the plane crossing that deflecting plane at right angles are convex toward the photoreceptor drum. The radius of curvature R2M of the arc of a circle in the deflecting plane corresponds to the distance between the rotating axis R2 and the lens surface S2 in the axial direction.

To attain balance between fθ and imaging characteristics using only one fθ lens element in the embodiment under consideration, the absolute value of R1M, or the near-axis radius of curvature of the aspheric surf ace, is preferably adjusted to be greater than the absolute value of R2M, or the radius of curvature of the arc of a circle formed by the toric surface in the deflecting plane. Further, in order to insure that the conjugated relationship between a point of deflection and the scanning surface is assured without undue strain, the absolute value of R1S, or the radius of curvature of the arc of a circle formed by the aspheric surface in the plane crossing the deflecting plane at right angles is preferably adjusted to be greater than the absolute value of R2S, or the radius of curvature of the arc of a circle formed by the toric surface in the plane crossing the deflecting plane at right angles. Thus, the fθ lens is preferably designed to satisfy the following conditions:

$$R1M/R2M < -1 \quad (2)$$

$$R1S/R2S > 1 \quad (3)$$

Table 1 shows the dimensions of various parts of the Fθ lens 22 fabricated in the embodiment (Embodiment 1) using amorphous polyolefin, as well as the values of R2M/f and R2S/f. In Table 1, n signifies the refractive index of the amorphous polyolefin; d1, the axial distance between lens surfaces S1 and S2; d0, the axial distance from the reflecting surface 20 of the polygonal mirror 18 to the lens surface S1 of the fθ lens which is directed toward the polygonal mirror 18; d2, the axial distance between the lens surface S2 of the fθ lens which is directed toward the photoreceptor drum 26 and the surface of the drum (for d0, d1 and d2, see FIG. 1(a)); f, the focal length of the fθ lens in the deflecting plane; θ, the maximum viewing angle; and λ, the wavelength of laser beam. The dimensions of the various parts of the fθ lens are expressed in millimeters.

The distance from the center of rotation of the polygonal mirror 18 to the reflecting surface 20 is 17 mm, and the incident light on the polygonal mirror is assumed to be launched in the axial direction. This assumption is made for the simplicity in the description of the embodiment and the results will be substantially the same if other angles of incidence are considered.

Figure 6A:
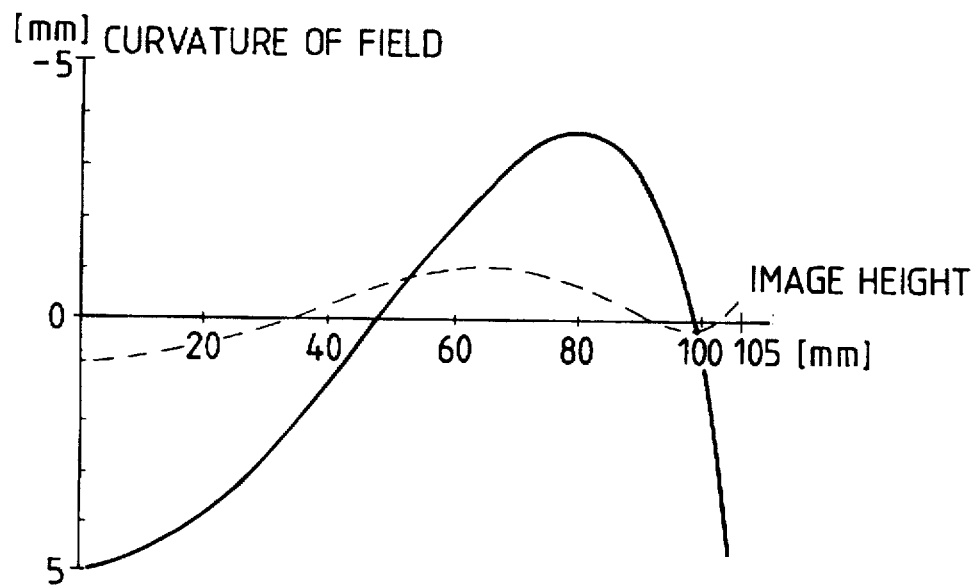
FIG. 6(a) is a graph showing the curvatures of field that develop in Embodiment 1.
Figure 6B:
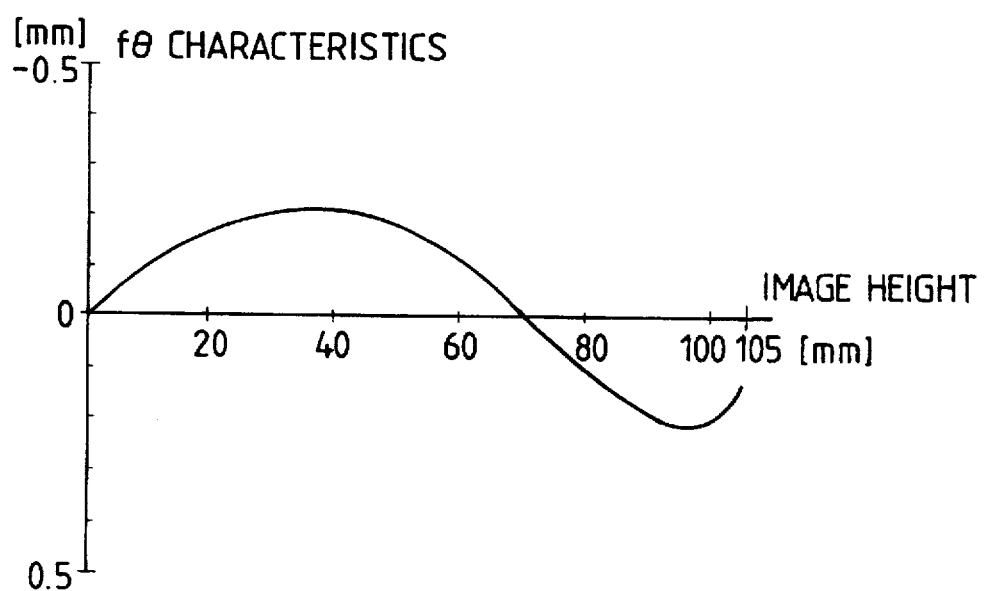
FIG. 6(b) is a graph showing the fθ characteristics of Embodiment 1.
Figure 7A:
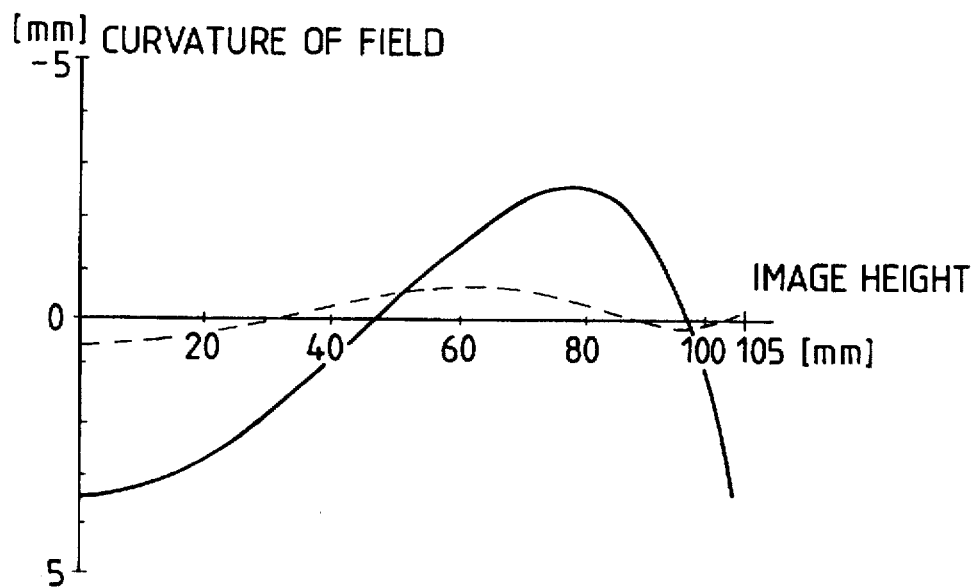
FIG. 7(a) is a graph showing the curvatures of field that develop in Embodiment 2.
Figure 7B:
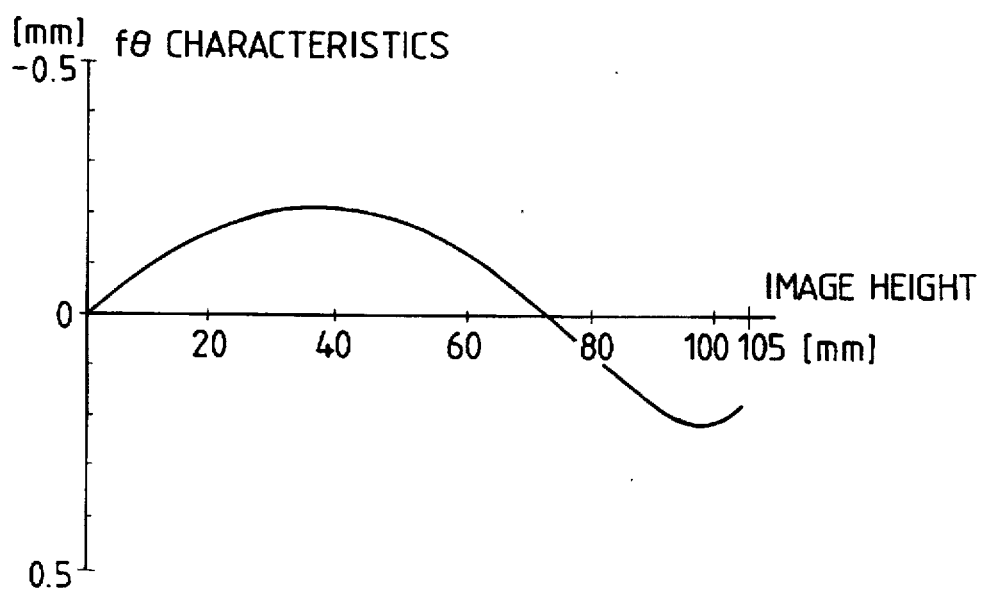
FIG. 7(b) is a graph showing the fθ characteristics of Embodiment 2.
Figure 8A:
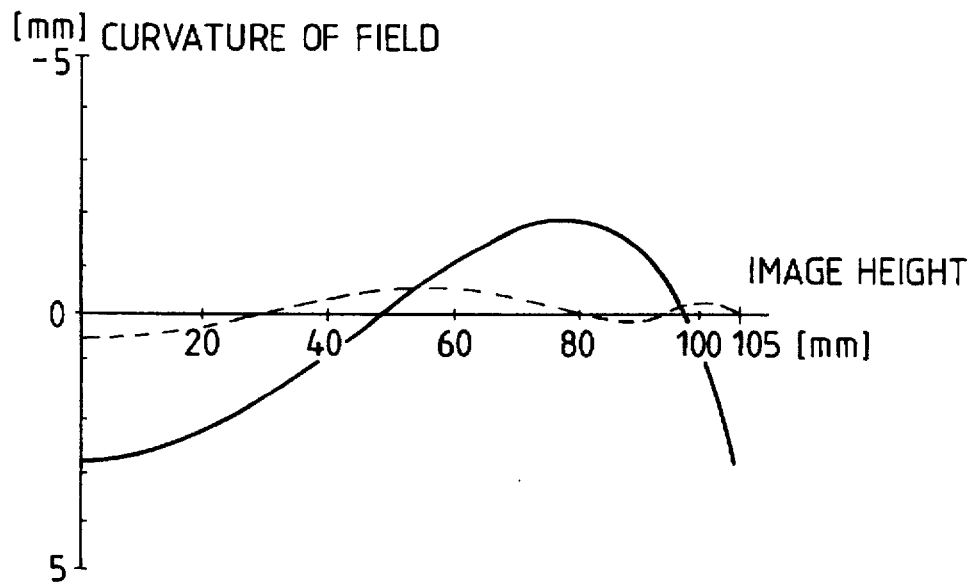
FIG. 8(a) is a graph showing the curvatures of field that develop in Embodiment 3.
Figure 8B:
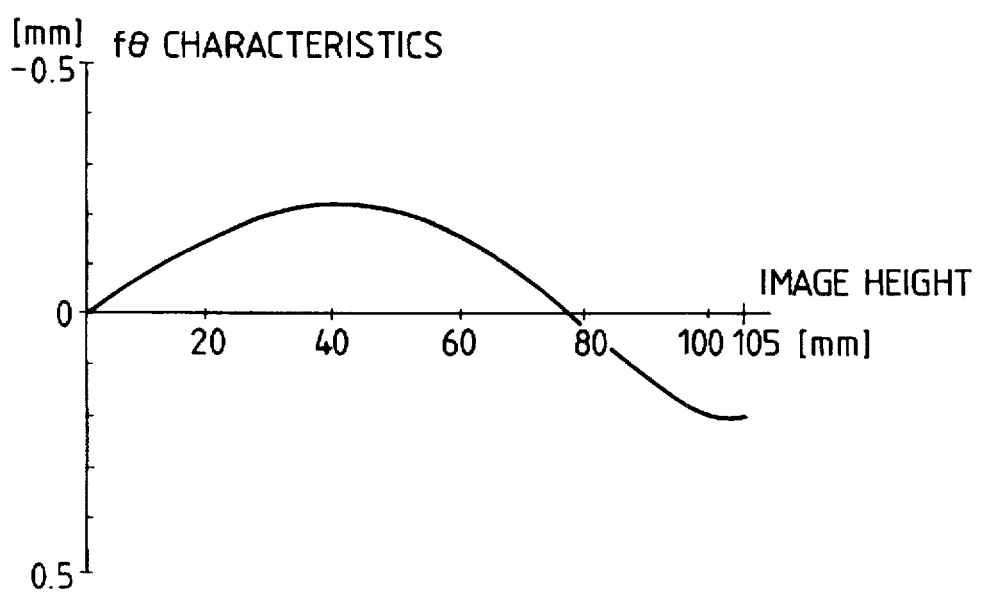
FIG. 8(b) is a graph showing the Fθ characteristics of Embodiment 3.
Figure 9A:
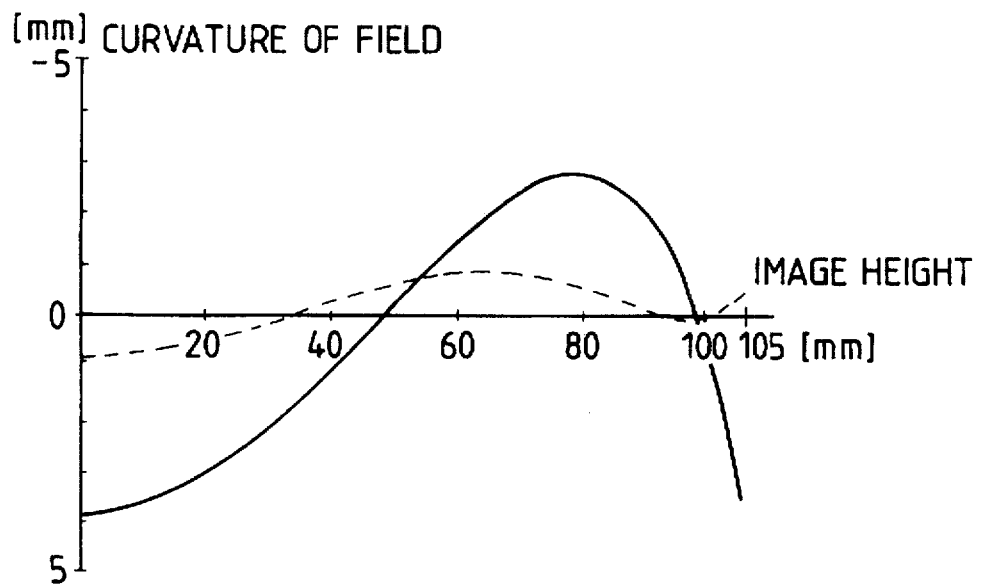
FIG. 9(a) is a graph showing the curvatures of field that develop in Embodiment 4.
Figure 9B:
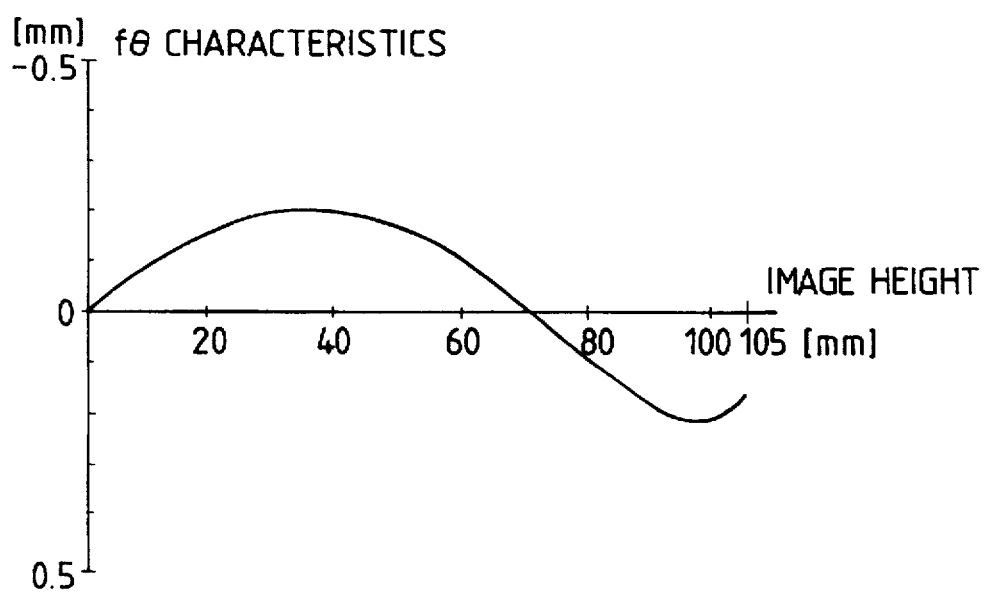
FIG. 9(b) is a graph showing the Fθ characteristics of Embodiment 4.
Figure 10A:
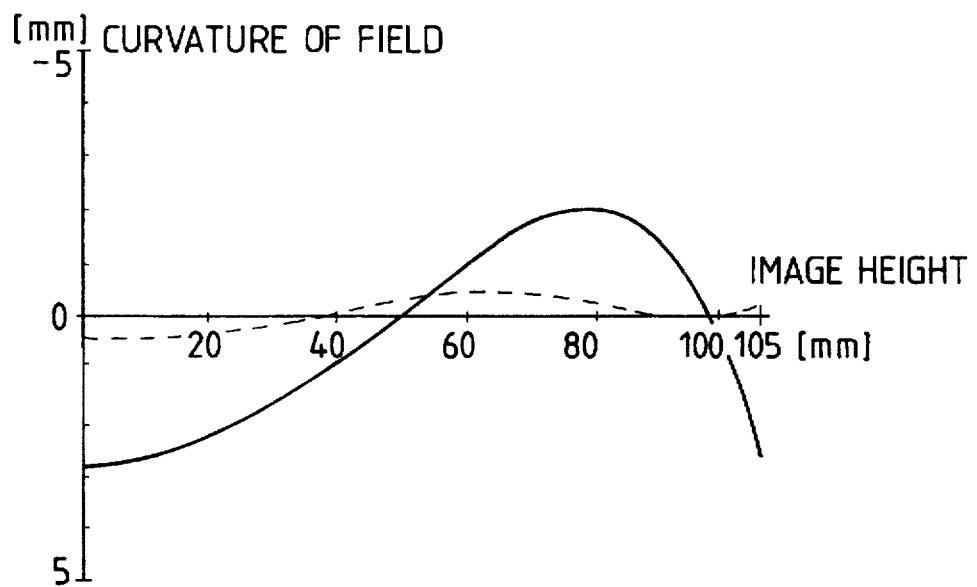
FIG. 10(a) is a graph showing the curvatures of field that develop in Embodiment 5.
Figure 10B:
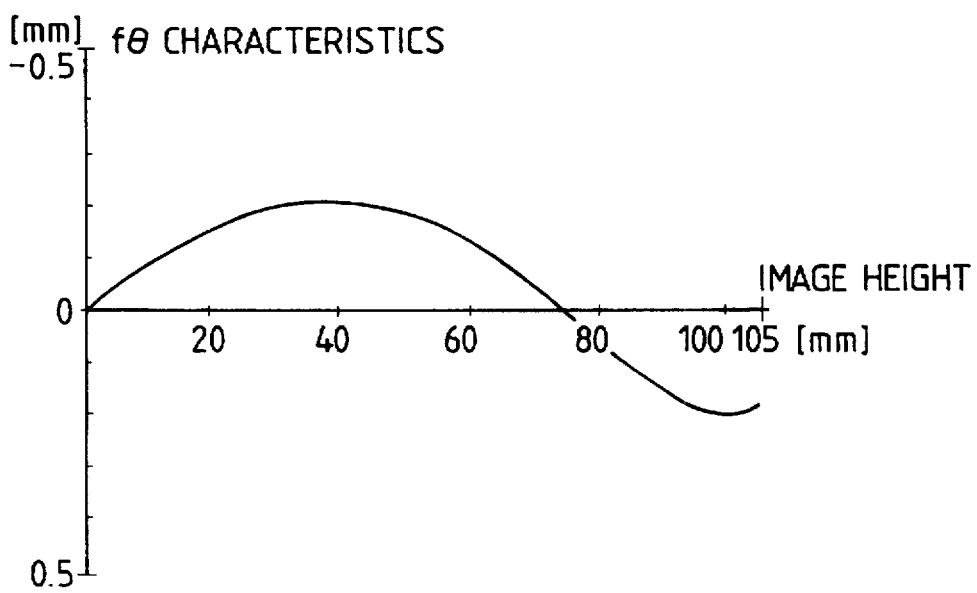
FIG. 10(b) is a graph showing the fθ characteristics of Embodiment 5.
Figure 11A:
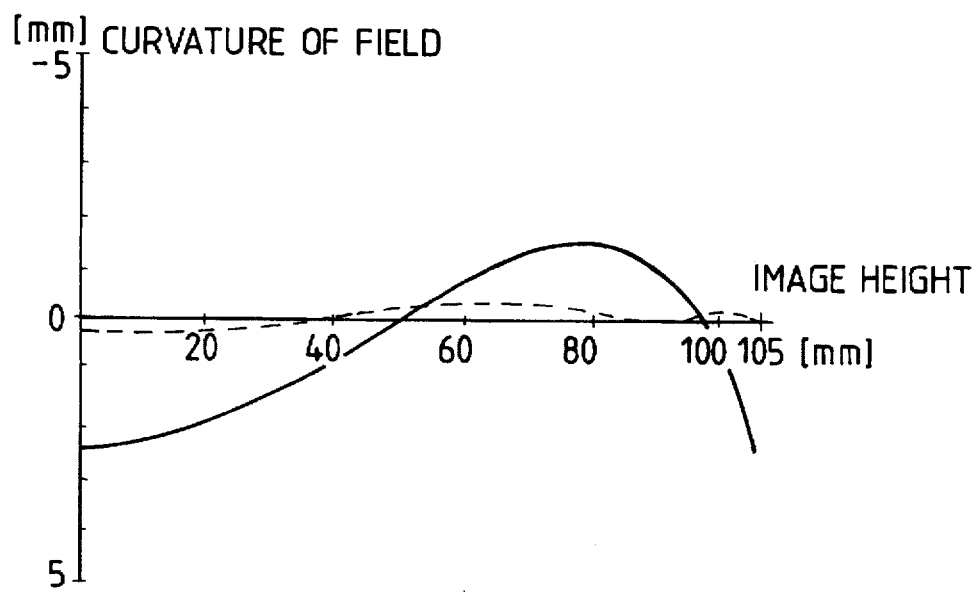
FIG. 11(a) is a graph showing the curvatures of field that develop in Embodiment 6.
Figure 11B:
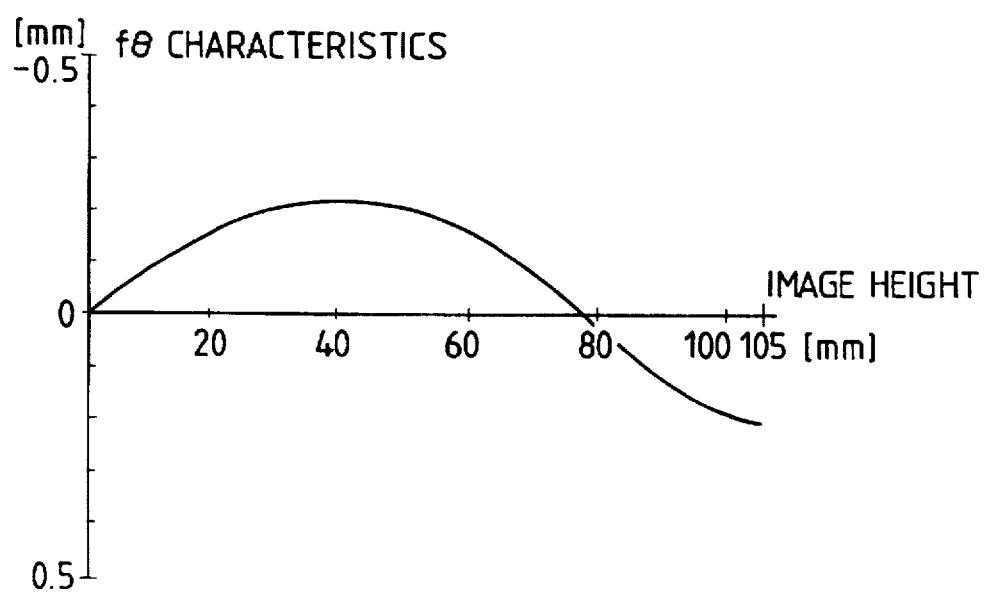
FIG. 11(b) is a graph showing the Fθ characteristics of Embodiment 6.
Figure 12A:
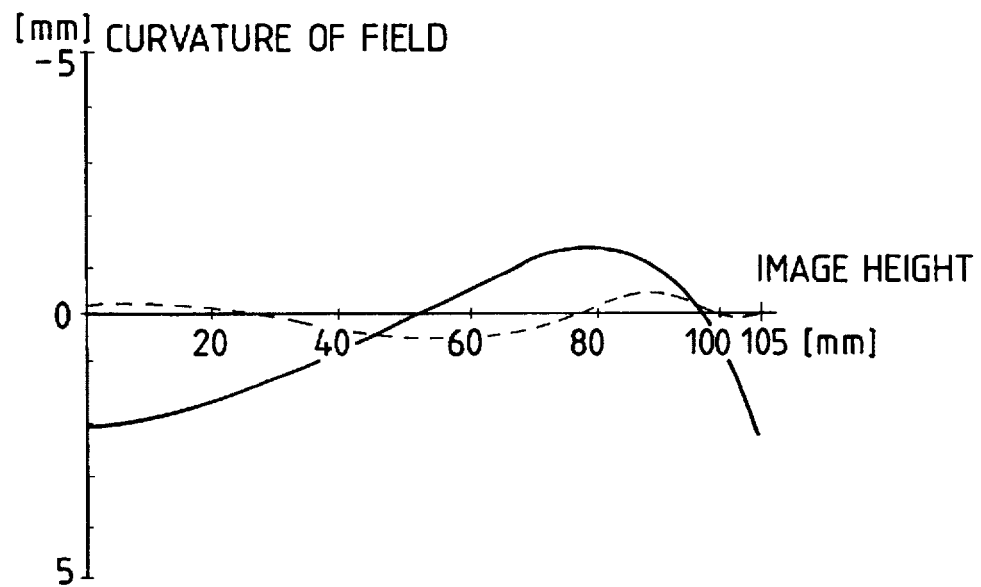
FIG. 12(a) is a graph showing the curvatures of field that develop in Embodiment 7.
Figure 12B:
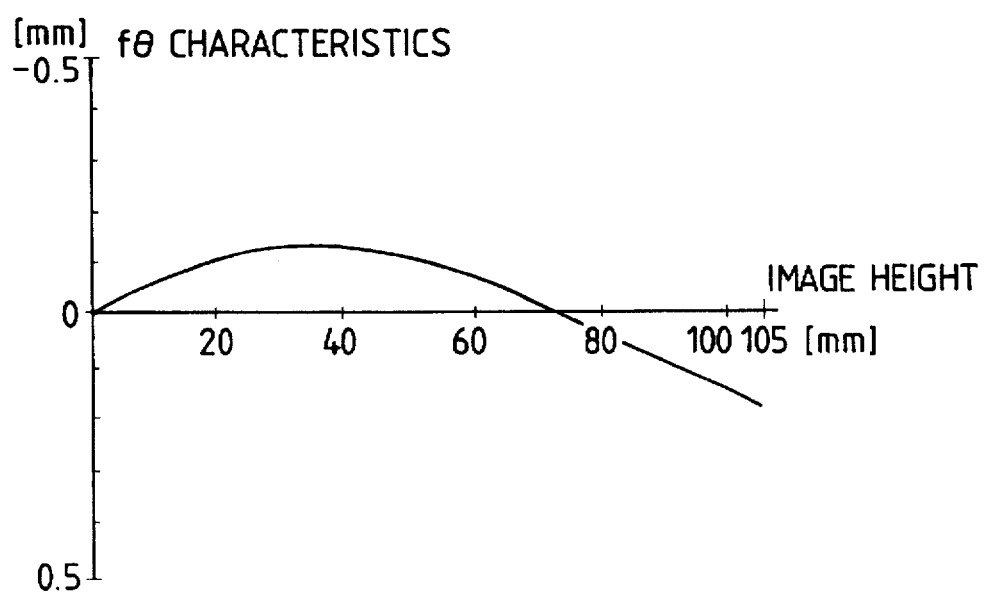
FIG. 12(b) is a graph showing the fθ characteristics of Embodiment 7.
Figure 13A:
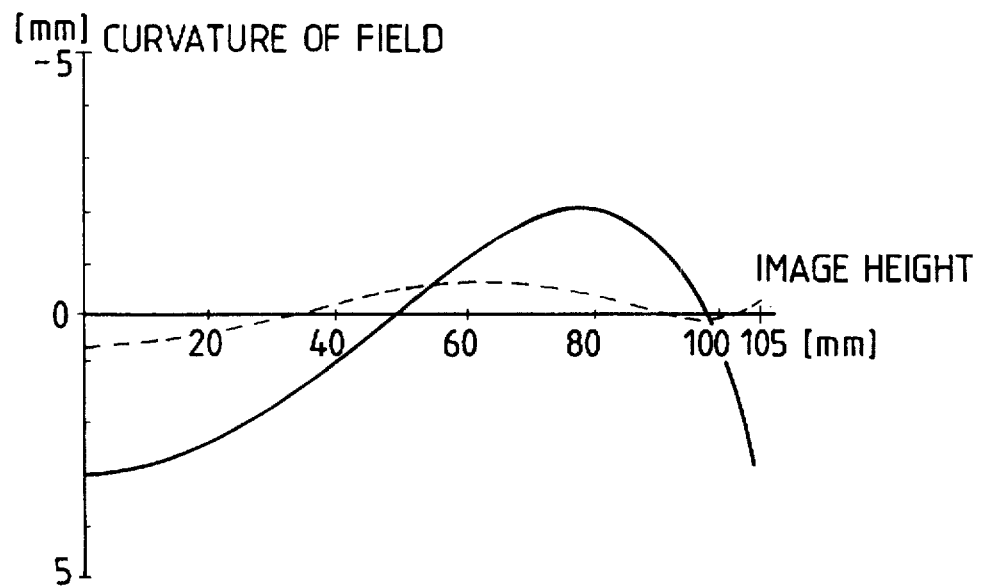
FIG. 13(a) is a graph showing the curvatures of field that develop in Embodiment 8.
Figure 13B:
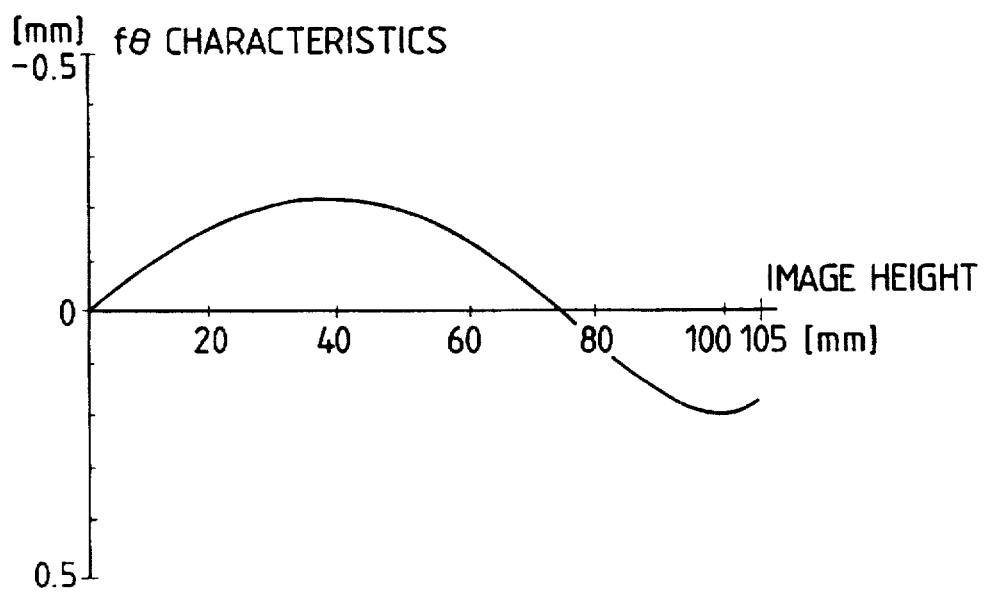
FIG. 13(b) is a graph showing the Fθ characteristics of Embodiment 8.
Figure 14A:
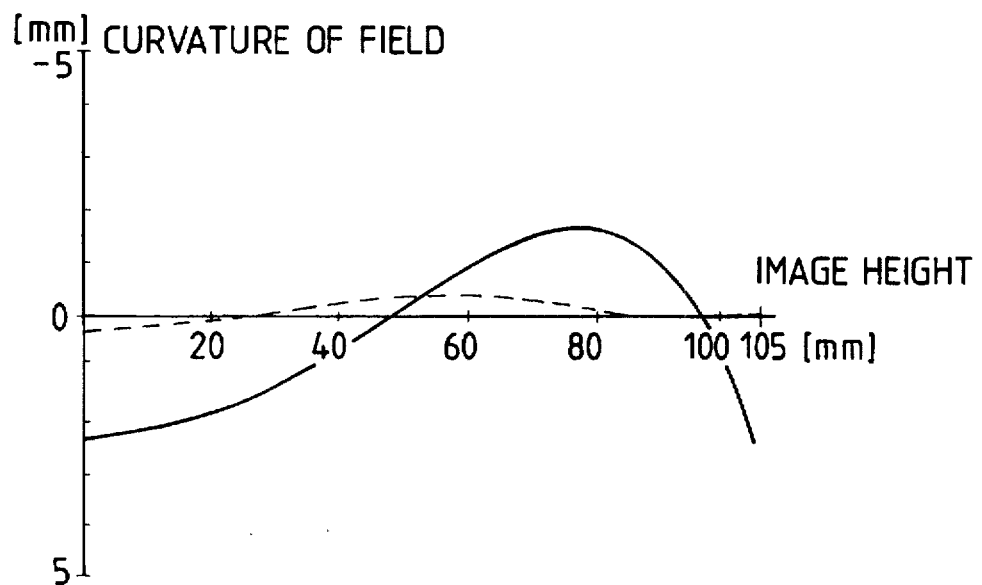
FIG. 14(a) is a graph showing the curvatures of field that develop in Embodiment 9.
Figure 14B:
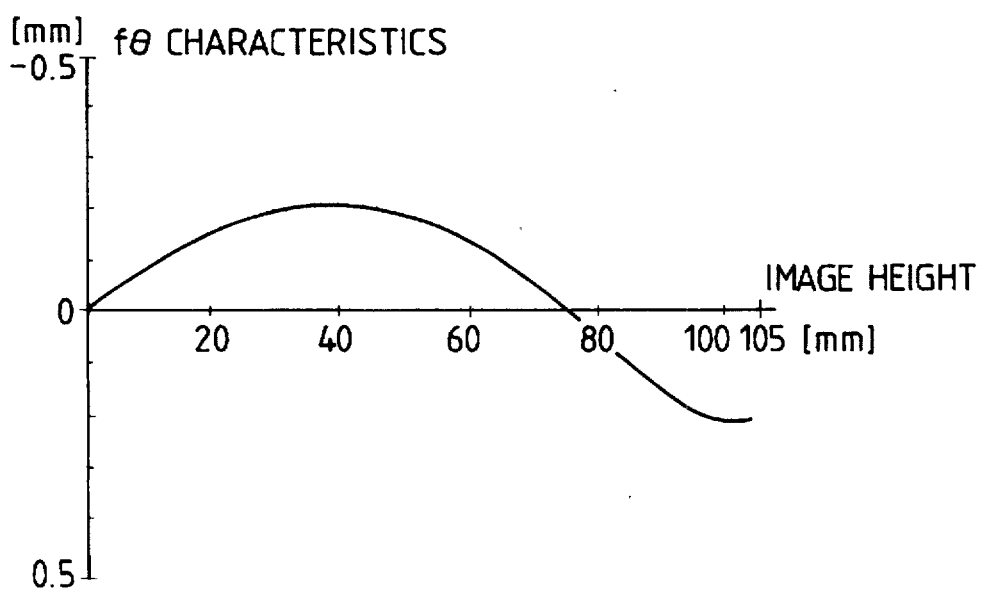
FIG. 14(b) is a graph showing the fθ characteristics of Embodiment 9.
Figure 15A:
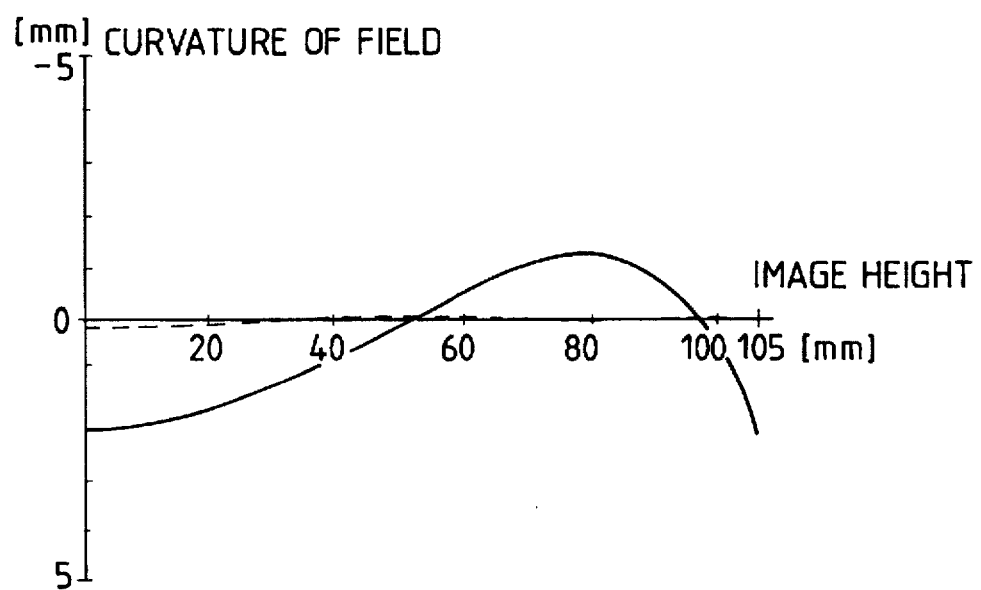
FIG. 15(a) is a graph showing the curvatures of field that develop in Embodiment 10.
Figure 15B:
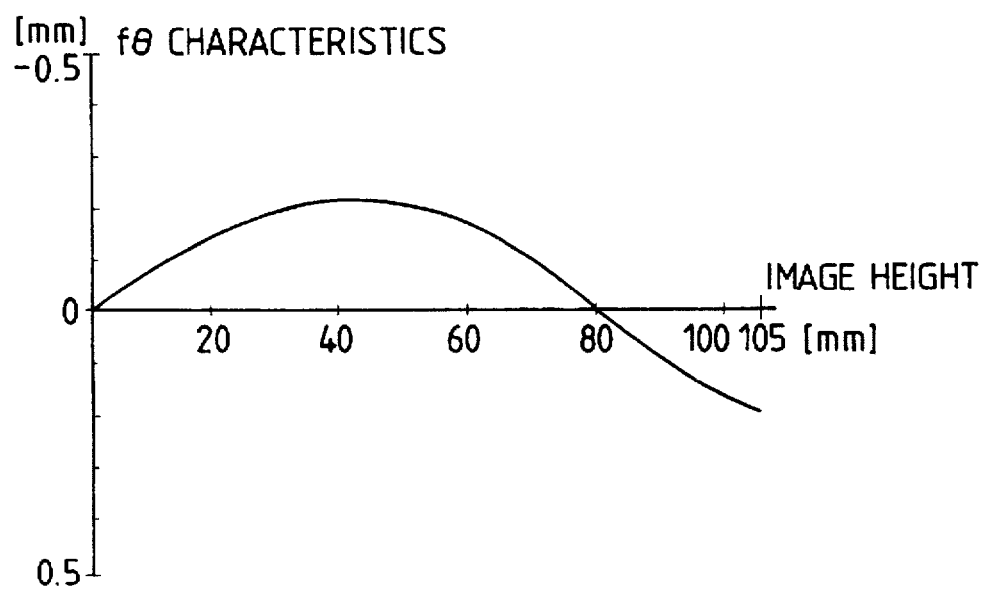
FIG. 15(b) is a graph showing the Fθ characteristics of Embodiment 10.
Figure 16A:
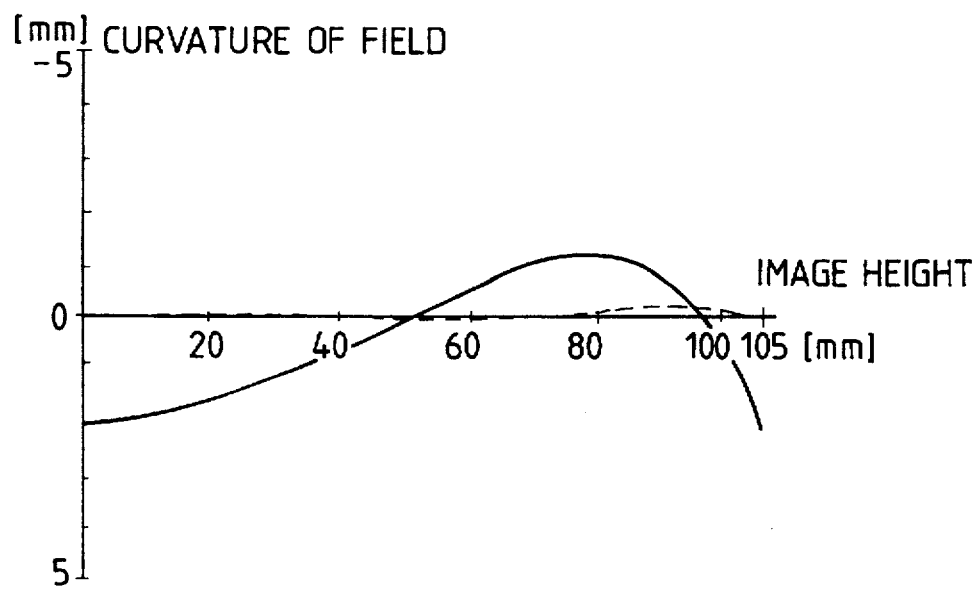
FIG. 16(a) is a graph showing the curvatures of field that develop in Embodiment 11.
Figure 16B:
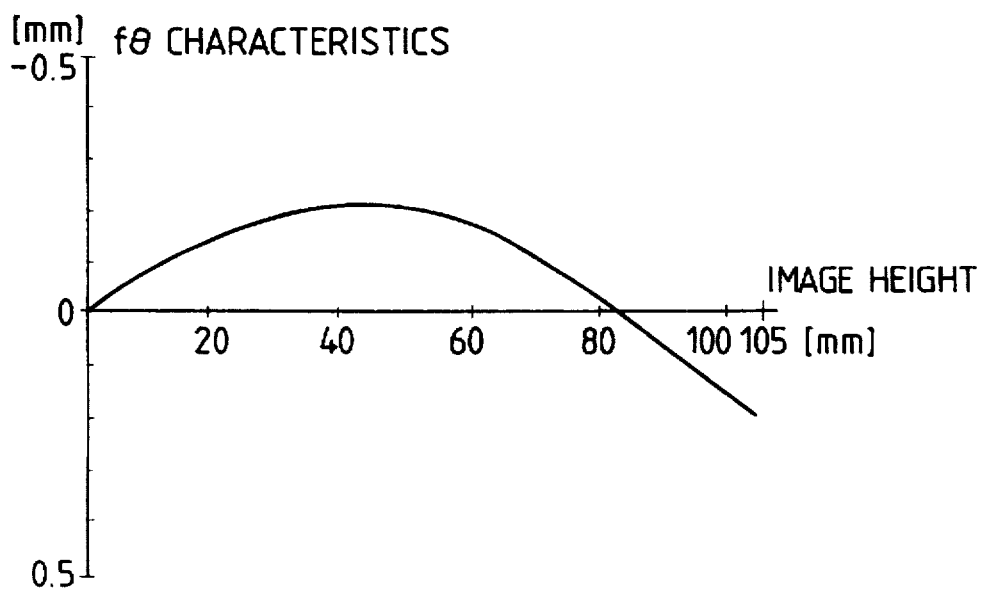
FIG. 16(b) is a graph showing the Fθ characteristics of Embodiment 11.
Figure 17A:
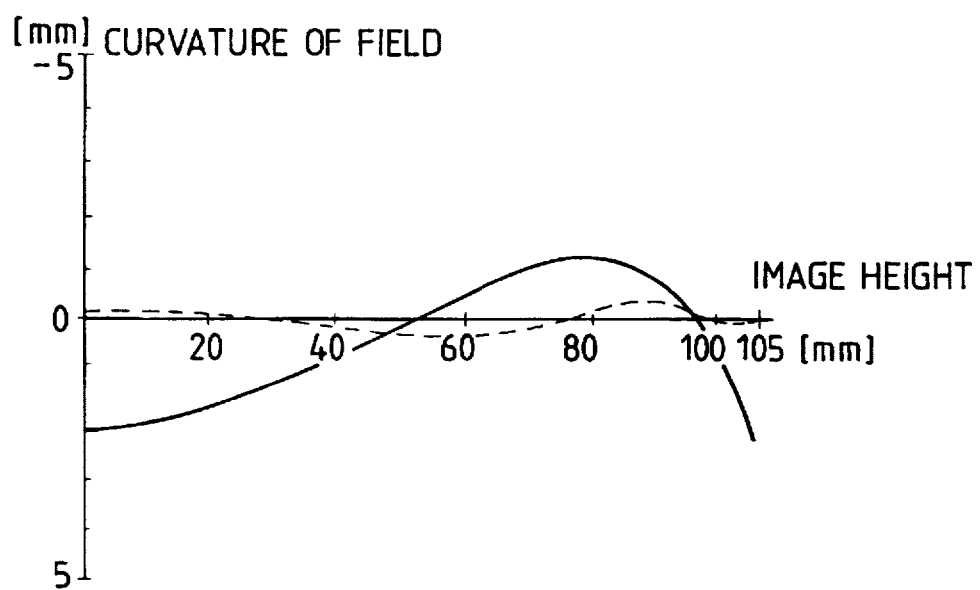
FIG. 17(a) is a graph showing the curvatures of field that develop in Embodiment 12.
Figure 17B:
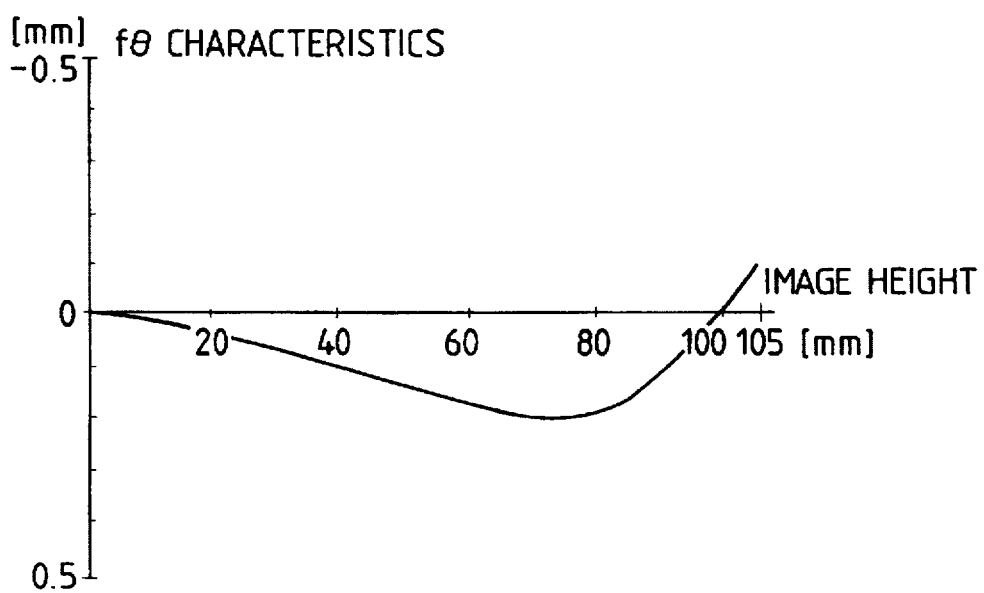
FIG. 17(b) is a graph showing the fθ characteristics of Embodiment 12.
Figure 18A:
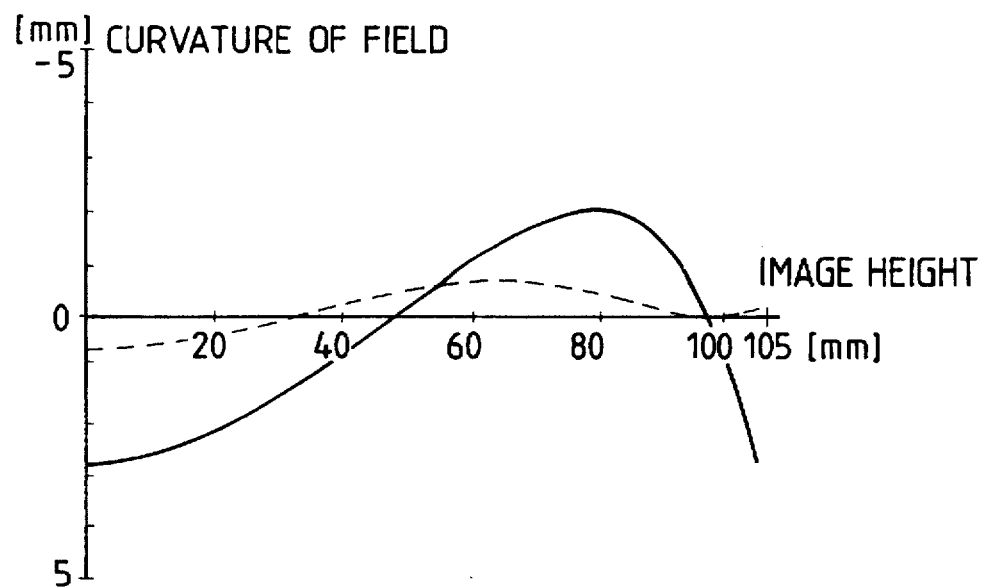
FIG. 18(a) is a graph showing the curvatures of field that develop in Embodiment 13.
Figure 18B:
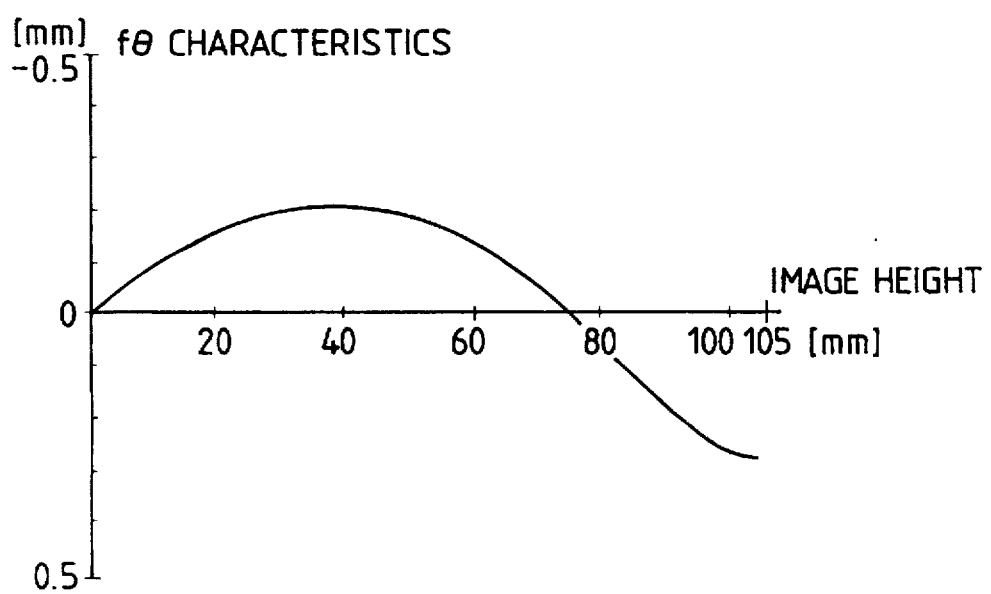
FIG. 18(b) is a graph showing the fθ characteristics of Embodiment 13.
Figure 19A:
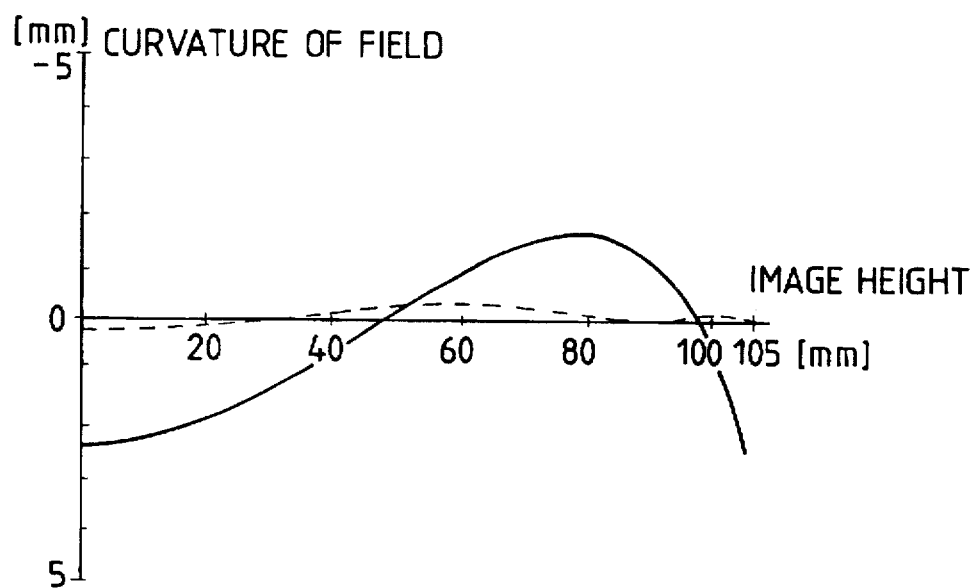
FIG. 19(a) is a graph showing the curvatures of field that develop in Embodiment 14.
Figure 19B:
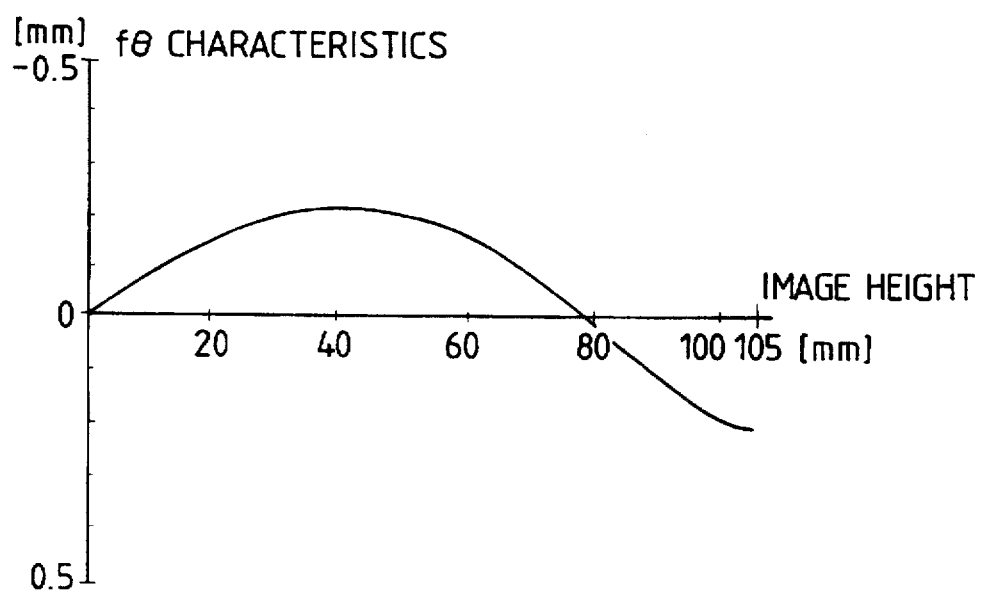
FIG. 19(b) is a graph showing the fθ characteristics of Embodiment 14.
Figure 20A:
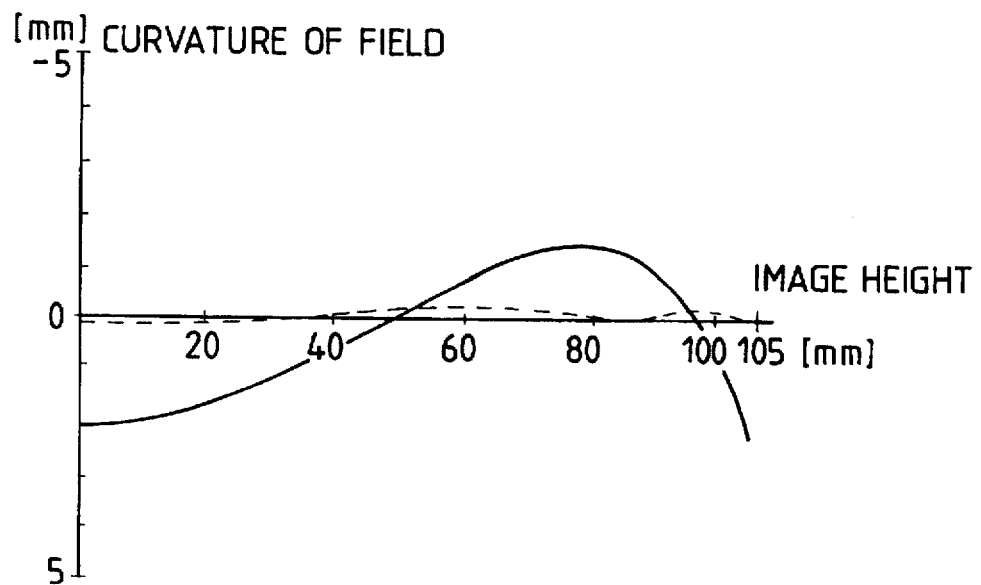
FIG. 20(a) is a graph showing the curvatures of field that develop in Embodiment 15.
Figure 20B:
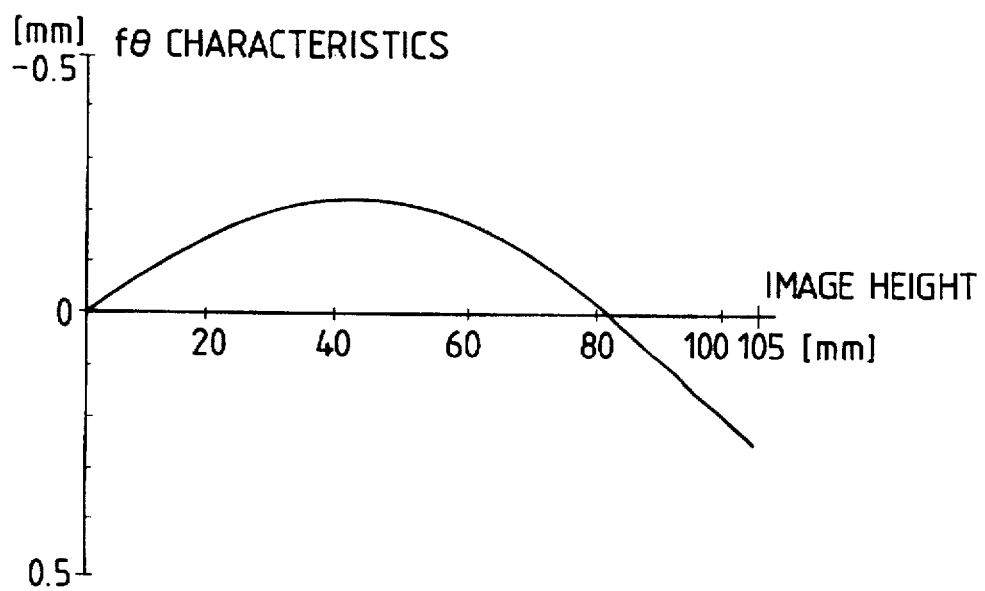
FIG. 20(b) is a graph showing the fθ characteristics of Embodiment 15.
Figure 21A:
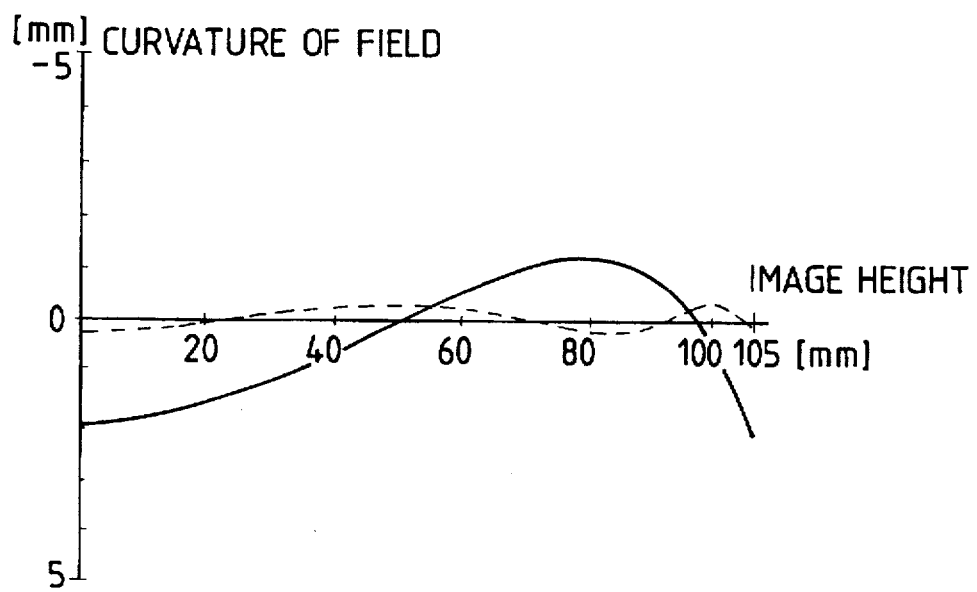
FIG. 21(a) is a graph showing the curvatures of field that develop in Embodiment 16.
Figure 21B:
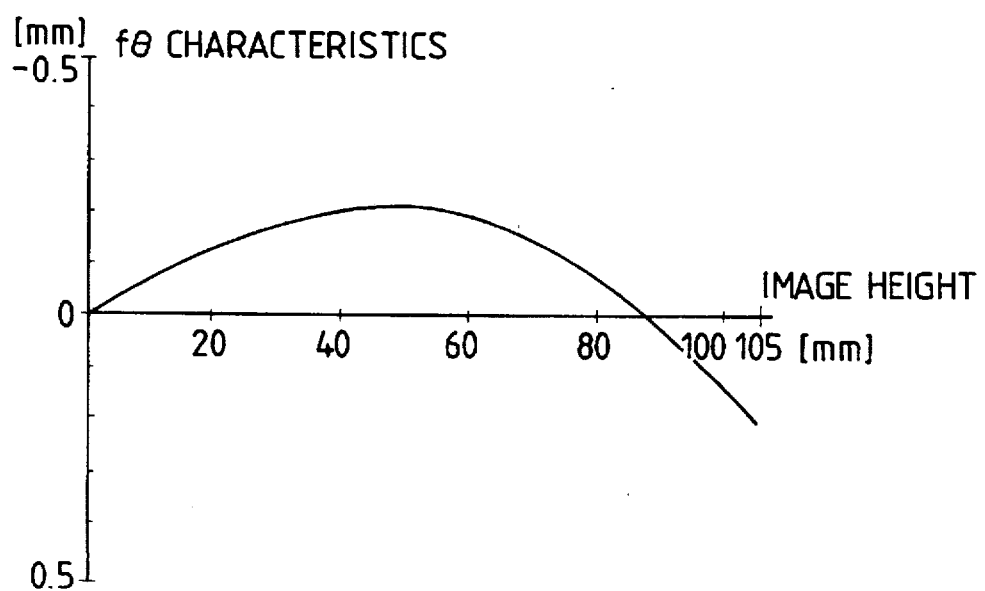
FIG. 21(b) is a graph showing the fθ characteristics of Embodiment 16.
Figure 22A:
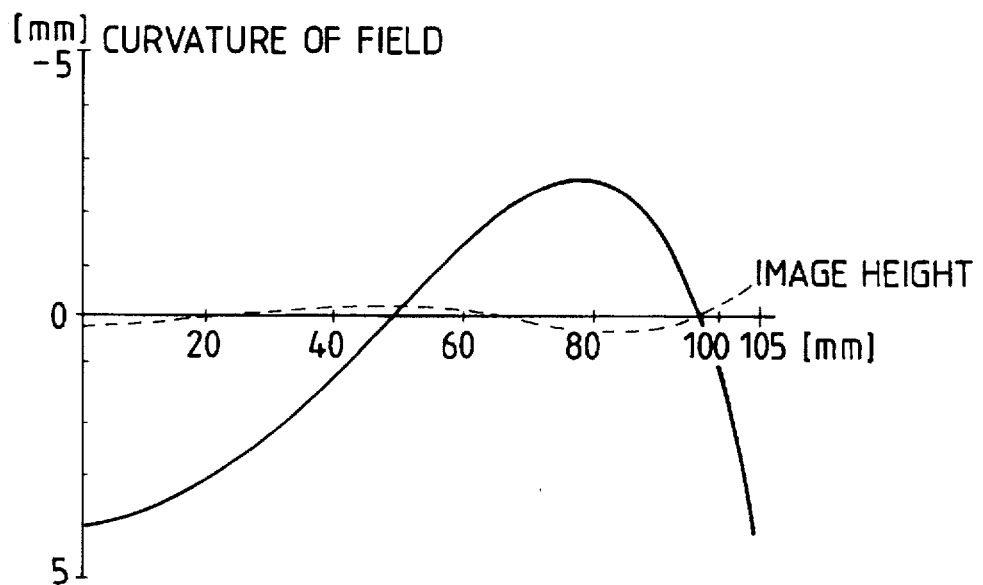
FIG. 22(a) is a graph showing the curvatures of field that develop in Embodiment 17.
Figure 22B:
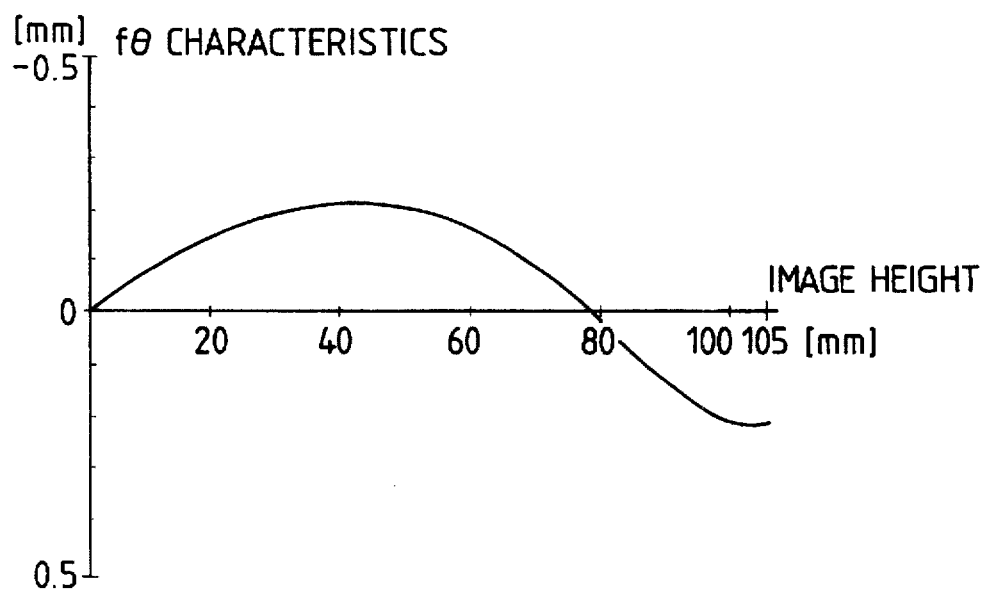
FIG. 22(b) is a graph showing the fθ characteristics of Embodiment 17.
Figure 23A:
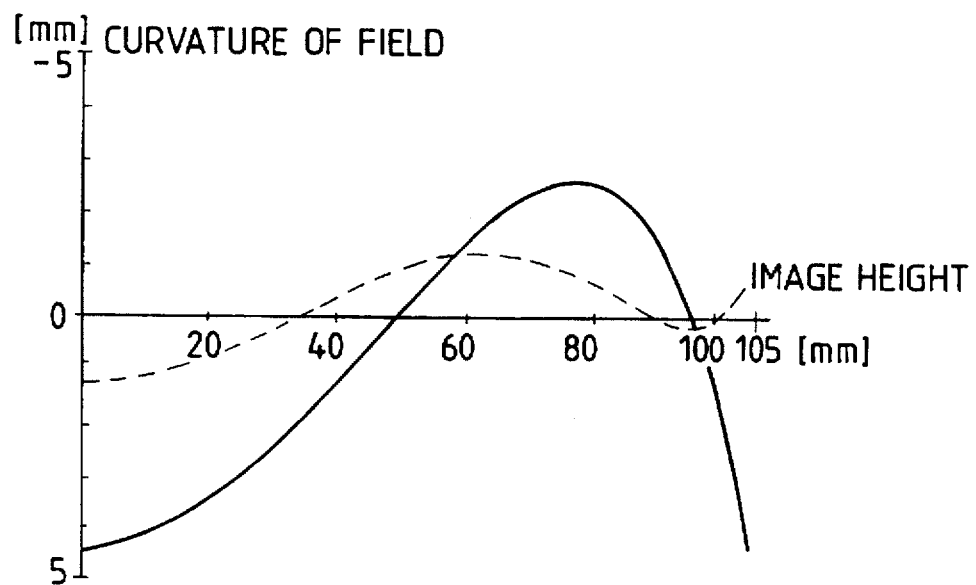
FIG. 23(a) is a graph showing the curvatures of field that develop in Embodiment 18.
Figure 23B:
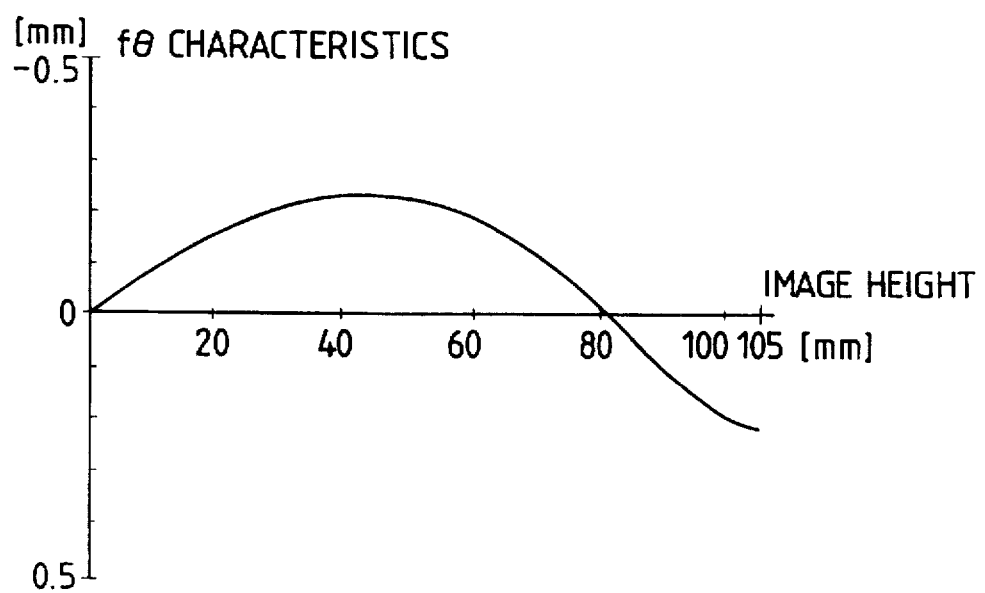
FIG. 23(b) is a graph showing the Fθ characteristics of Embodiment 18.
Figure 24A:
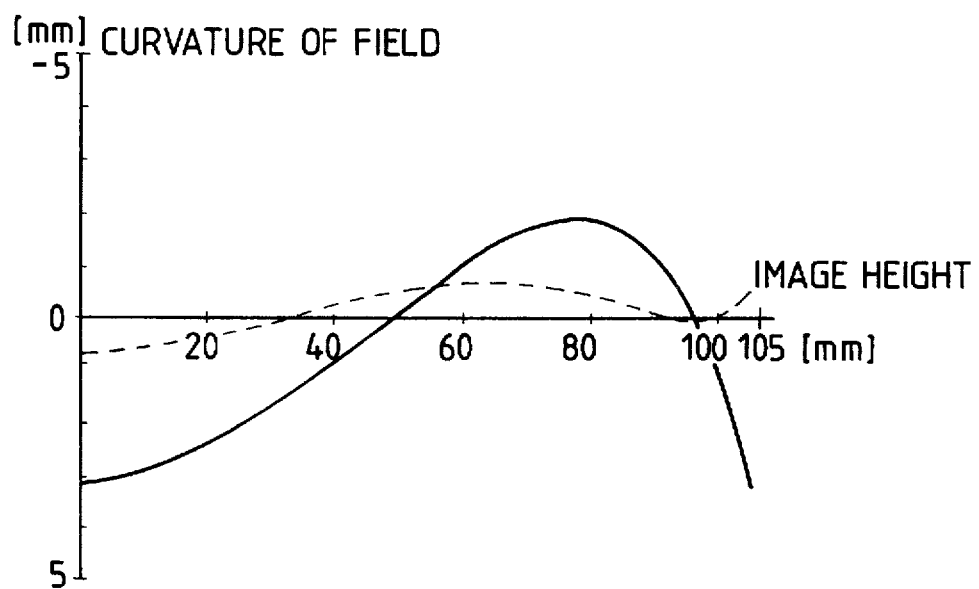
FIG. 24(a) is a graph showing the curvatures of field that develop in Embodiment 19.
Figure 24B:
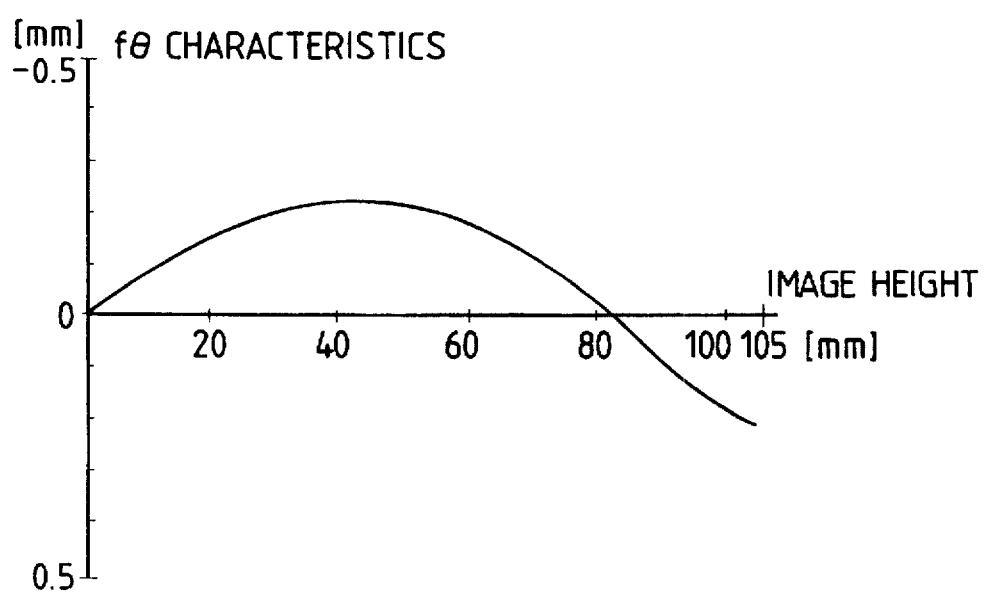
FIG. 24(b) is a graph showing the Fθ characteristics of Embodiment 19.
Figure 25A:
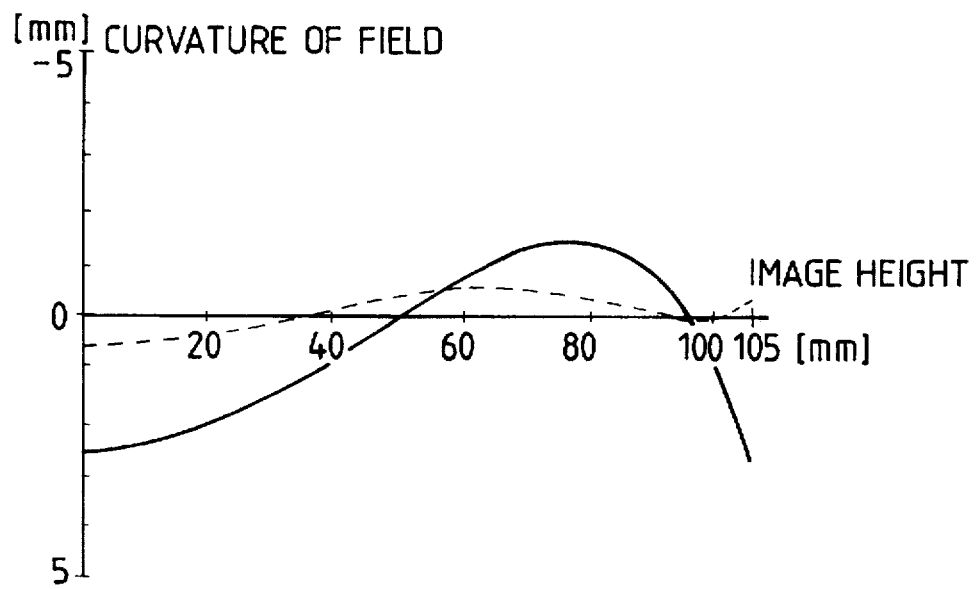
FIG. 25(a) is a graph showing the curvatures of field that develop in Embodiment 20.
Figure 25B:
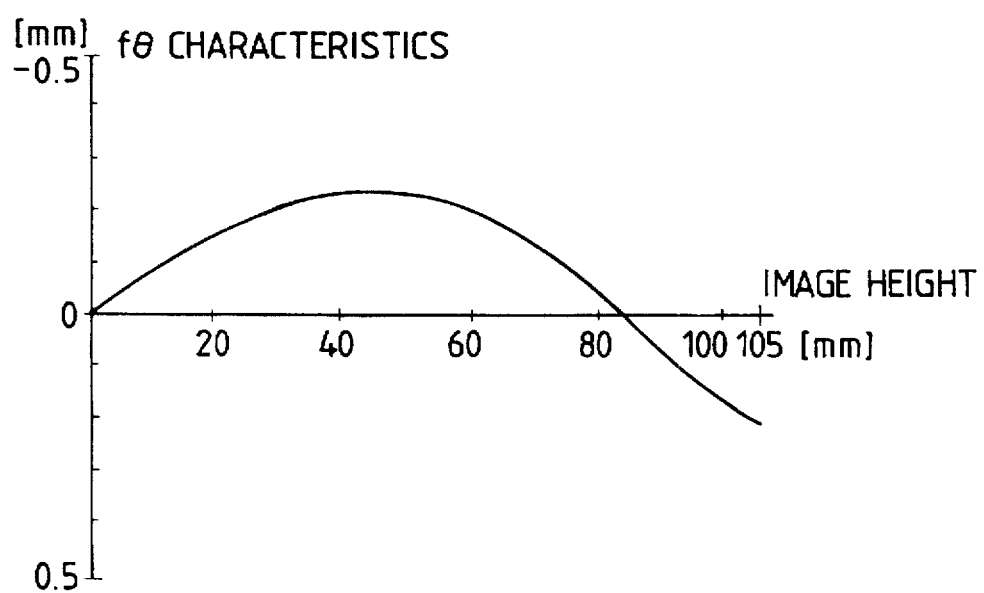
FIG. 25(b) is a graph showing the fθ characteristics of Embodiment 20.
Figure 26A:
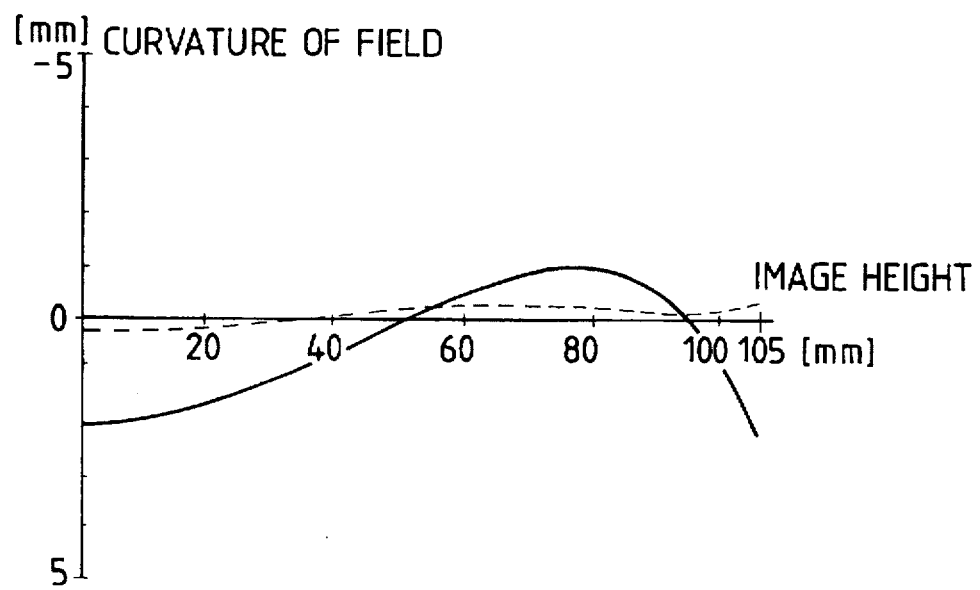
FIG. 26(a) is a graph showing the curvatures of field that develop in Embodiment 21.
Figure 26B:
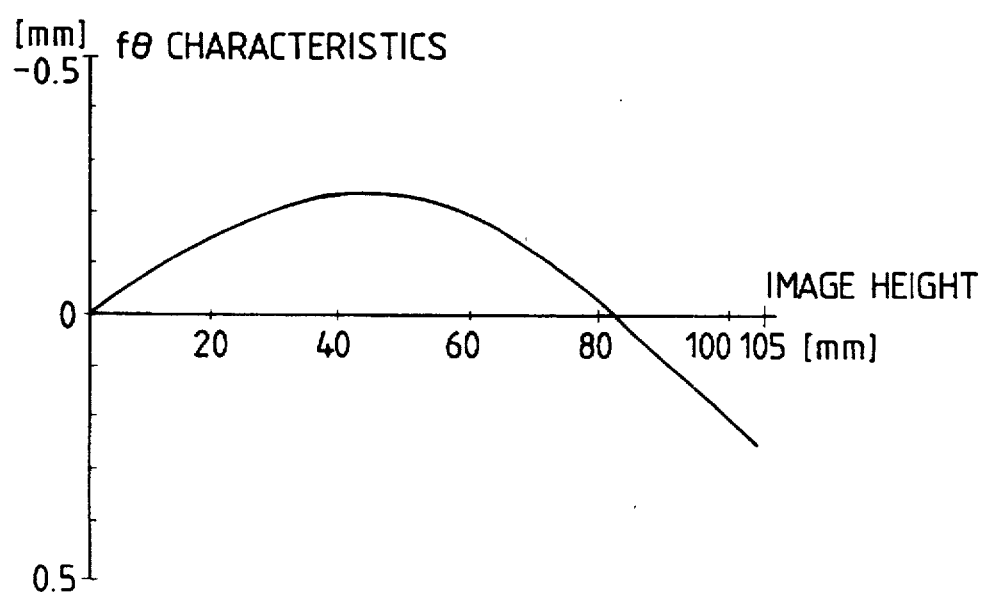
FIG. 26(b) is a graph showing the Fθ characteristics of Embodiment 21.
Figure 27A:
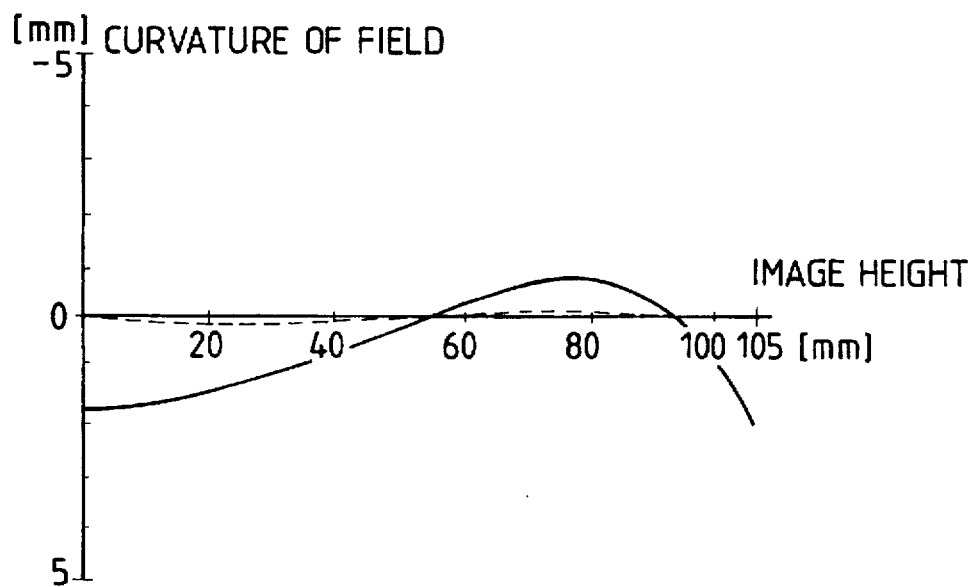
FIG. 27(a) is a graph showing the curvatures of field that develop in Embodiment 22.
Figure 27B:
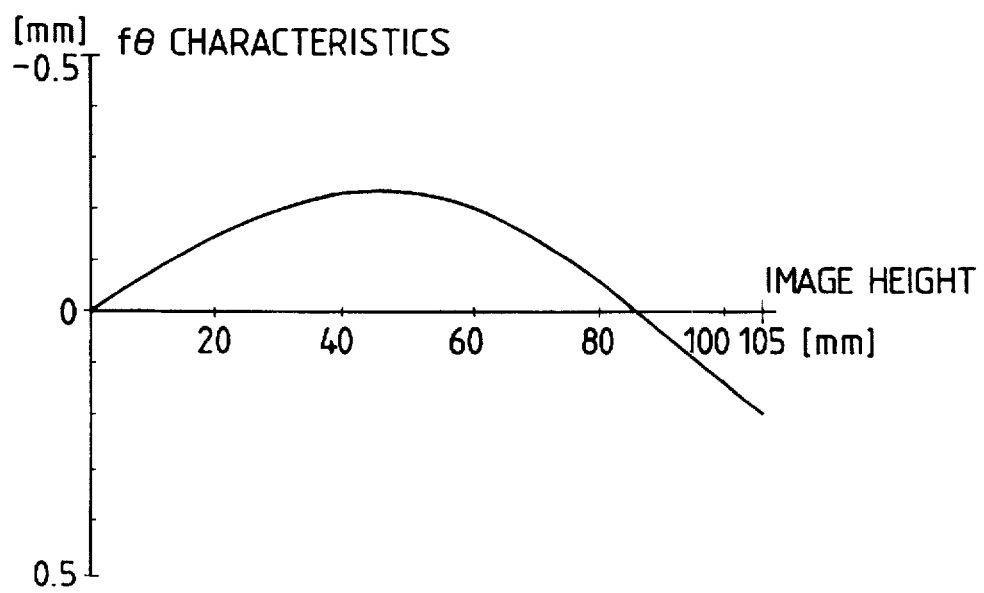
FIG. 27(b) is a graph showing the Fθ characteristics of Embodiment 22.
Figure 28A:
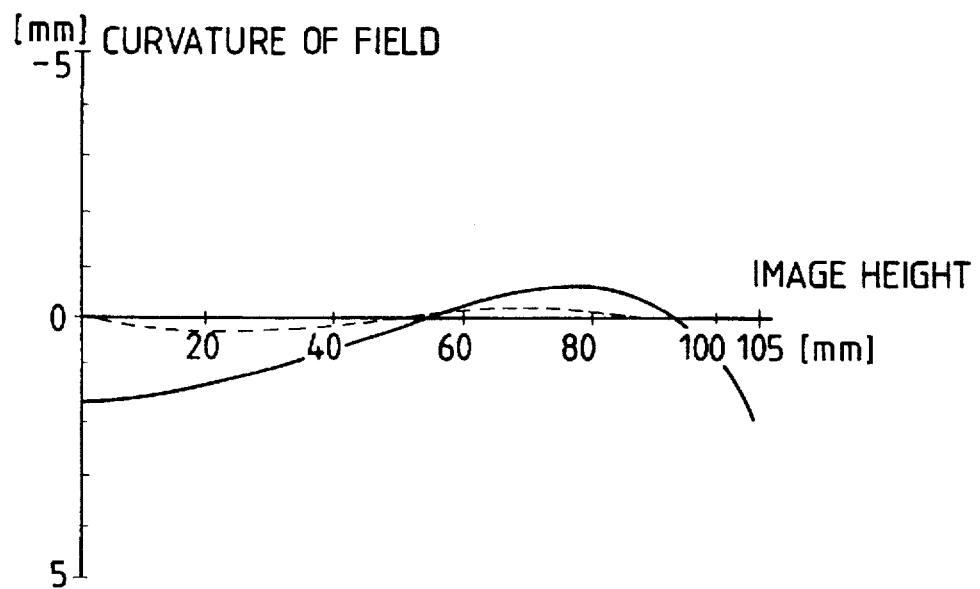
FIG. 28(a) is a graph showing the curvatures of field that develop in Embodiment 23.
Figure 28B:
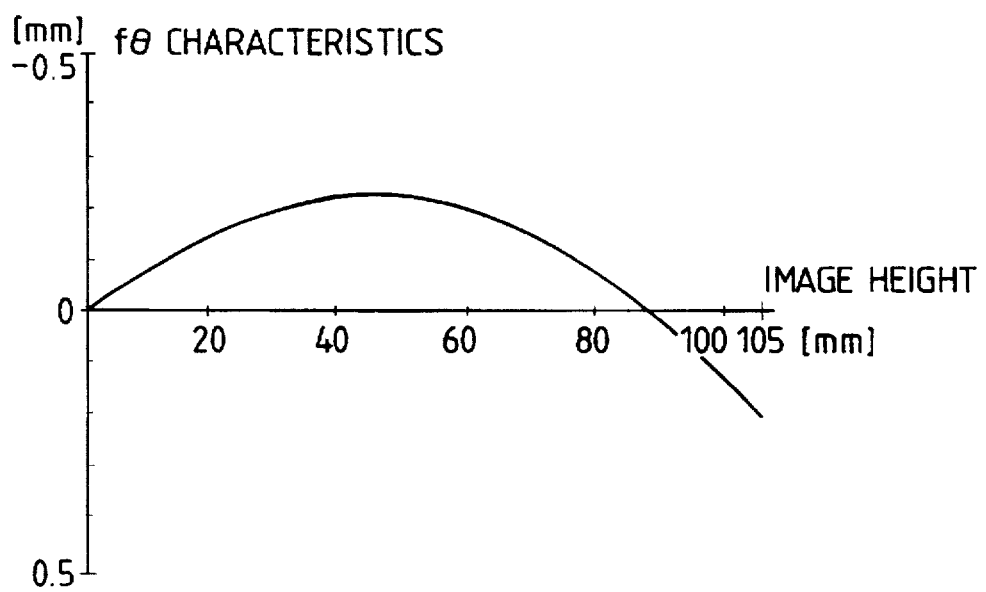
FIG. 28(b) is a graph showing the Fθ characteristics of Embodiment 23.
Figure 29A:
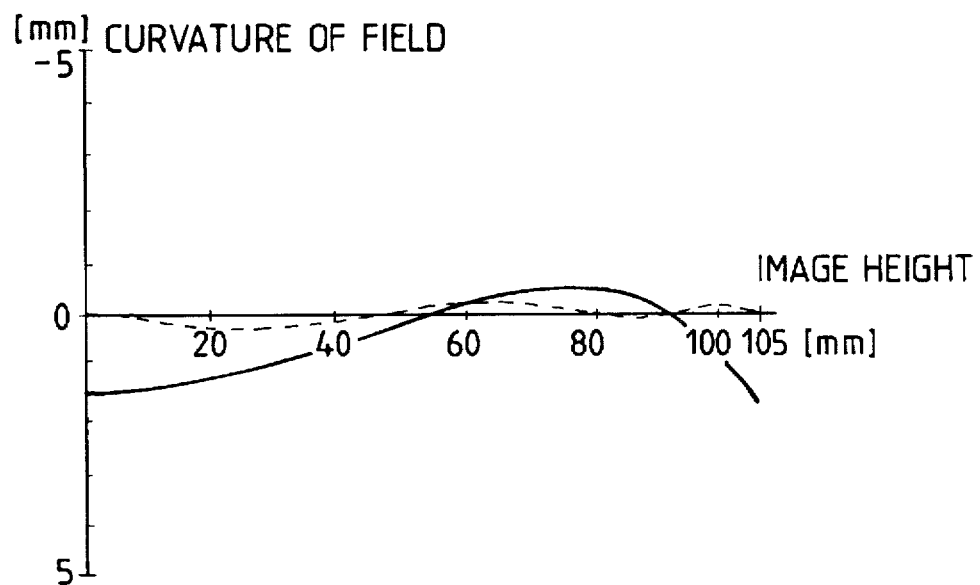
FIG. 29(a) is a graph showing the curvatures of field that develop in Embodiment 24.
Figure 29B:
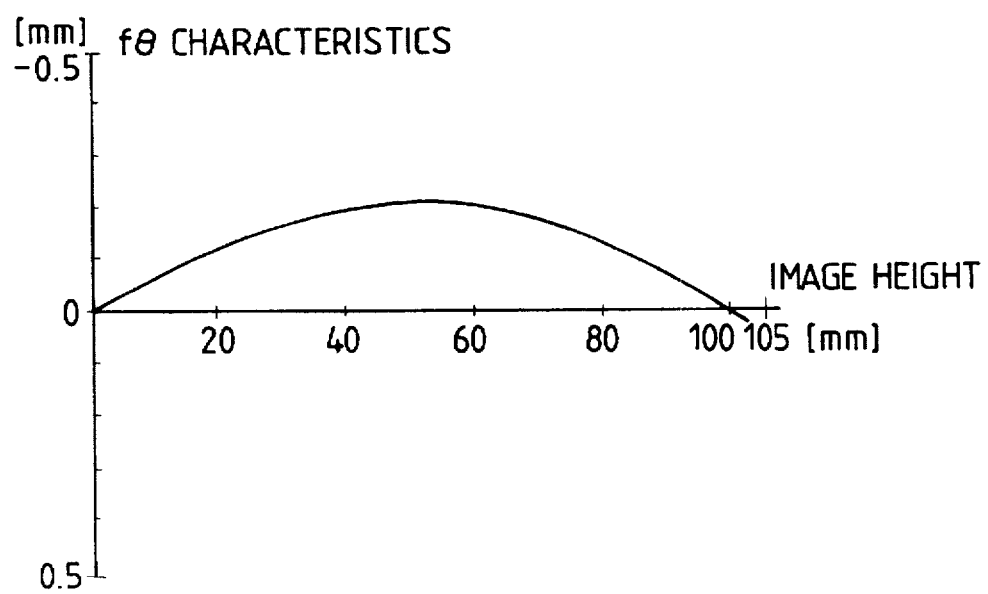
FIG. 29(b) is a graph showing the Fθ characteristics of Embodiment 24.

The curvatures of field that develop in the Fθ lens specified in Table 1 are shown in FIG. 6(a), and the Fθ characteristics of the same lens are shown in FIG. 6(b) as expressed by the departure from the ideal position. The dashed line in FIG. 6(a) refers to the curvature of field that occurs in the main scanning direction and the solid line in the sub-scanning direction.

Tables 2 to 24 show the dimensions of various parts of the Fθ lenses fabricated in Embodiments 2 to 24, respectively, for use in an optical scanner of the same type as shown in FIG. 4, as well as the values of R2M/f and R2S/f. The curvatures of field that develop in the Fθ lenses of Embodiments 2 to 24 are shown in FIGS. 7(a) to 29(a), respectively, and the Fθ characteristics of those lenses are shown in FIGS. 7(b) to 29(b), respectively. The axes of each graph are graduated on the same scale as in FIG. 6(a) or 6(b).

In Embodiments 2 to 12, plastic amorphous polyolefin was used as an optical material (this is the same as in Embodiment 1) but the value of d0 or d1 was varied as a parameter. The ideal focal length which was the reference for the Fθ characteristics was 143.2394488 mm.

In Embodiments 13 to 16, plastic polycarbonate (n=1.572) was used as an optical material and the value of d0 or d1 was varied as a parameter. The ideal focal length which was the reference for the Fθ characteristics was 143.2394488 mm.

In Embodiments 17 to 24, plastic amorphous polyolefin was used as an optical material and the value of d0 or d1 was varied as a parameter. The ideal focal length which was the reference for the fθ characteristics was 171.8873385 mm.

Figure 5:
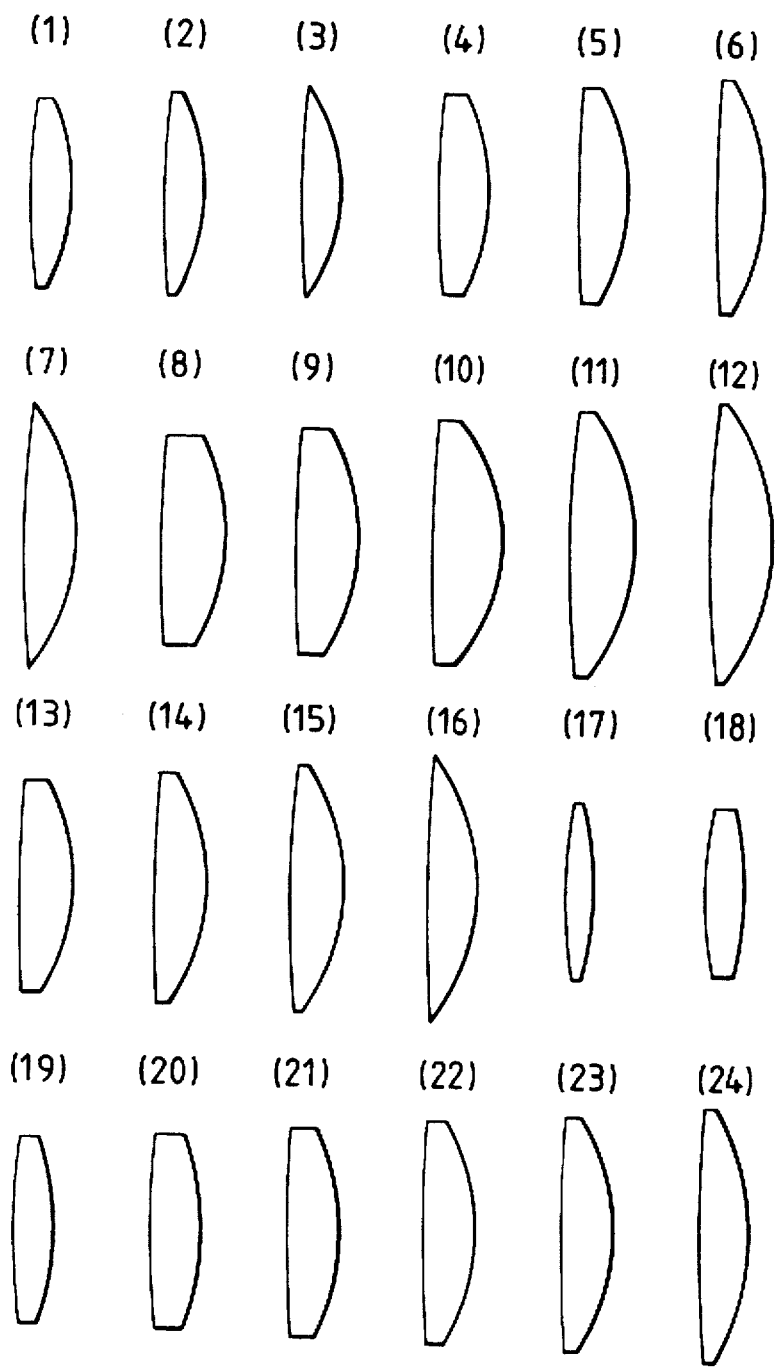
FIG. 5 is an illustration of the shapes of the fθ lenses in Embodiments 1 to 24, respectively, as they are cut across the deflecting plane.

Cross sections of the fθ lenses of Embodiments 1 to 24 as taken through the deflecting plane are shown in (1) to (24) of FIG. 5, respectively.

As one can see from FIGS. 7(a) to 29(b), the curvatures of field were corrected satisfactorily and the departure from the ideal position was within approximately 0.2 mm in all cases, indicating that the fθ characteristics of all lenses were satisfactory.

TABLE 1

| | | | |
|---|---|---|---|
| f = 142.606 | θ = 42° | λ = 785 nm | n = 1.519139 |
| R1M = 254.56 | R1S = −47.3427 | d0 = 35 | d1 = 15 |
| K = −62.4716 | | A = −2.469558e-08 | |
| B = −2.214005e-11 | | C = 2.056345e-14 | |
| D = −3.828980e-18 | | | |
| R2M = −102.29 | R2S = −14.7322 | d2 = 138.863 | |
| R2M/f = −0.717292 | | | |
| R2S/f = −0.103307 | | | |

TABLE 2

| | | | |
|---|---|---|---|
| f = 142.388 | θ = 42° | λ = 785 nm | n = −1.519139 |
| R1M = 371.838 | R1S = −65.3726 | d0 = 40 | d1 = 15 |
| K = −123.228 | | A = −1.675487e-09 | |
| B = −3.154253e-11 | | C = 1.715654e-14 | |
| D = −3.078761e-18 | | | |
| R2M = −90.9883 | R2S = −16.3749 | d2 = 139.868 | |
| R2M/f = −0.639015 | | | |
| R2S/f = −0.115002 | | | |

TABLE 3

| | | | |
|---|---|---|---|
| f = 142.364 | θ = 42° | λ = 785 nm | n = 1.519139 |
| R1M = 483.102 | R1S = −79.1382 | d0 = 45 | d1 = 15 |
| K = −154.428 | | A = −2.524309e-08 | |
| B = −2.961573e-11 | | C = 1.698681e-14 | |
| D = −3.084330e-18 | | | |
| R2M = −86.3295 | R2S = −17.7224 | d2 = 140.375 | |
| R2M/f = −0.6064 | | | |
| R2S/f = −0.124487 | | | |

TABLE 4

| | | | |
|---|---|---|---|
| f = 142.542 | θ = 42° | λ = 785 nm | n = 1.519139 |
| R1M = 305.607 | R1S = −50.484 | d0 = 35 | d1 = 20 |
| K = −54.7013 | | A = −1.762649e-07 | |
| B = 6.137468e-11 | | C = −1.006156e-14 | |
| D = 1.195257e-18 | | | |
| R2M = −95.4584 | R2S = −15.924 | d2 = 138.584 | |
| R2M/f = −0.669686 | | | |
| R2S/f = −0.111714 | | | |

TABLE 5

| | | | |
|---|---|---|---|
| f = 142.294 | θ = 42° | λ = 785 nm | n = 1.519139 |
| R1M = 424.17 | R1S = −66.5754 | d0 = 40 | d1 = 20 |
| K = −175.157 | | A = −5.930637e-09 | |
| B = −3.225813e-11 | | C = 1.701016e-14 | |

TABLE 5-continued

D = −3.104361e-18
R2M = −88.0068    R2S = −17.4097    d2 = 139.589
R2M/f = −0.618485
R2S/f = −0.12235

TABLE 6 f = 142.162    θ = 42°    λ = 785 nm    n = 1.519139
R1M = 508.424    R1S = −77.7878    d0 = 45    d1 = 20
K = −267.105              A = 1.048047e-08
B = −3.925380e-11         C = 1.536481e-14
D = −2.336280e-18
R2M = −85.1731    R2S = −18.6322    d2 = 140.057
R2M/f = −0.599129
R2S/f = −0.131063

TABLE 7 f = 142.267    θ = 42°    λ = 785 nm    n = 1.519139
R1M = 450.278    R1S = −89.3893    d0 = 55    d1 = 20
K = −9.27359              A = −2.128092e-07
B = 4.926618e-11          C = −1.013730e-14
D = 9.434915e-19
R2M = −87.0067    R2S = −20.6142    d2 = 140.394
R2M/f = −0.611572
R2S/f = −0.144898

TABLE 8 f = 142.408    θ = 42°    λ = 785 nm    n = 1.519139
R1M = 357.807    R1S = −52.7976    d0 = 35    d1 = 25
K = −60.1005             A = −2.228546e-07
B = 8.788177e-11         C = −2.290403e-14
D = 3.726137e-18
R2M = −90.958    R2S = −17.0251    d2 = 138.433
R2M/f = −0.638714
R2S/f = −0.119552

TABLE 9 f = 142.251    θ = 42°    λ = 785 nm    n = 1.519139
R1M = 476.896    R1S = −66.4797    d0 = 40    d1 = 25
K = −43.9693             A = −2.259877e-07
B = 6.035689e-11         C = −9.250965e-15
D = 2.305965e-19
R2M = −85.8136    R2S = −18.3662    d2 = 139.382
R2M/f = −0.603254
R2S/f = −0.129111

TABLE 10 f = 142.165    θ = 42°    λ = 785 nm    n = 1.519139
R1M = 534.403    R1S = −75.0873    d0 = 45    d1 = 25
K = −19.3016             A = −2.241411e-07
B = 4.920673e-11         C = −8.272617e-15
D = 5.648496e-19
R2M = −84.2606    R2S = −19.4695    d2 = 139.738
R2M/f = −0.592694
R2S/f = −0.13695

TABLE 11 f = 142.159    θ = 42°    λ = 785 nm    n = 1.519139
R1M = 516.634    R1S = −80.1094    d0 = 50    d1 = 25
K = −11.9036             A = −2.211047e-07

TABLE 11-continued

B = 4.637667e-11         C = −8.888002e-15
D = 8.144628e-19
R2M = −84.6756    R2S = −20.4173    d2 = 139.816
R2M/f = −0.595641
R2S/f = −0.143623

TABLE 12 f = 143.339    θ = 42°    λ = 785 nm    n = 1.519139
R1M = 357.022    R1S = −85.5898    d0 = 55    d1 = 25
K = −6.8644              A = −2.147111e-07
B = 4.687275e-11         C = −8.947363e-15
D = 7.838625e-19
R2M = −91.7568    R2S = −21.36    d2 = 140.129
R2M/f = −0.640138
R2S/f = −0.149017

TABLE 13 f = 142.474    θ = 42°    λ = 785 nm    n = 1.572
R1M = 661.117    R1S = −64.7012    d0 = 40    d1 = 20
K = −233.216             λ = −9.825750e-08
B = 1.086226e-11         C = 3.343290e-15
D = −9.647869e-19
R2M = −91.9301    R2S = −18.7314    d2 = 140.246
R2M/f = −0.645242
R2S/f = −0.131473

TABLE 14 f = 142.228    θ = 42°    λ = 785 nm    n = 1.572
R1M = 781.799    R1S = −76.2938    d0 = 45    d1 = 20
K = −355.119             A = −8.137584e-08
B = 8.4.79146e-12        C = 1.214473e-15
D = −4.998007e-19
R2M = −89.9582    R2S = −20.0937    d2 = 140.632
R2M/f = −0.632493
R2S/f = −0.141278

TABLE 15 f = 142.157    θ = 42°    λ = 785 nm    n = 1.572
R1M = 866.294    R1S = −84.428    d0 = 50    d1 = 20
K = −662.71              A = −3.477489e-08
B = −1.372531e-11        C = 5.662883e-15
D = −7.989134e-19
R2M = −88.9831    R2S = −21.2713    d2 = 140.833
R2M/f = −0.625949
R2S/f = −0.149632

TABLE 16 f = 142.369    θ = 42°    λ = 785 nm    n = 1.572
R1M = 777.344    R1S = −89.6837    d0 = 55    d1 = 20
K = −143.782             A = −9.505346e-08
B = 4.175589e-12         C = 1.747108e-15
D = −3.495448e-19
R2M = −90.1129    R2S = −22.3011    d2 = 140.826
R2M/f = −0.632954
R2S/f = −0.156643

TABLE 17 f = 170.662    θ = 35°    λ = 785 nm    n = 1.519139
R1M = 253.504    R1S = −49.6875    d0 = 45    d1 = 10

TABLE 17-continued

| | |
|---|---|
| K = −11.3596 | A = −2.478789e-07 |
| B = 7.187794e-11 | C = −3.903119e-15 |
| D = −2.329706e-18 | |
| R2M = −134.361  R2S = −15.935 | d2 = 168.168 |
| R2M/f = −0.787293 | |
| R2S/f = −0.093372 | |

TABLE 18

| | | | |
|---|---|---|---|
| f = 171.448 | θ = 35° | λ = 785 nm | n = 1.519139 |
| R1M = 217.373 | R1S = −35.3036 | d0 = 40 | d1 = 15 |
| K = −9.25082 | | A = −2.765835e-07 | |
| B = 3.173099e-11 | | C = 2.856643e-14 | |
| D = −7.269336e-18 | | | |
| R2M = −147.165 | R2S = −15.1471 | d2 = 166.125 | |
| R2M/f = −0.858364 | | | |
| R2S/f = −0.088348 | | | |

TABLE 19

| | | | |
|---|---|---|---|
| f = 170.893 | θ = 35° | λ = 785 nm | n = 1.519139 |
| R1M = 317.71 | R1S = −53.9148 | d0 = 45 | d1 = 15 |
| K = −6.89807 | | A = −2.167295e-07 | |
| B = 4.171191e-11 | | C = −3.098366e-15 | |
| D = 6.862227e-19 | | | |
| R2M = −121.201 | R2S = −17.3113 | d2 = 167.545 | |
| R2M/f = −0.708806 | | | |
| R2S/f = −0.10124 | | | |

TABLE 20

| | | | |
|---|---|---|---|
| f = 170.91 | θ = 35° | λ = 785 nm | n = 1.519139 |
| R1M = 367.995 | R1S = −56.8506 | d0 = 45 | d1 = 20 |
| K = −44.6457 | | A = −1.071839e-07 | |
| B = 2.202088e-11 | | C = −8.085255e-16 | |
| D = 4.504935e-19 | | | |
| R2M = −114.744 | R2S = −18.543 | d2 = 167.162 | |
| R2M/f = −0.67137 | | | |
| R2S/f = −0.108496 | | | |

TABLE 21

| | | | |
|---|---|---|---|
| f = 170.706 | θ = 35° | λ = 785 nm | n = 1.519139 |
| R1M = 502.402 | R1S = −72.5493 | d0 = 50 | d1 = 20 |
| K = −106.736 | | A = −5.781875e-08 | |
| B = 1.361146e-11 | | = −3.395741e-15 | |
| D = 7.176095e-19 | | | |
| R2M = −106.136 | R2S = −20.1182 | d2 = 168.101 | |
| R2M/f = −0.621749 | | | |
| R2S/f = −0.117853 | | | |

TABLE 22

| | | | |
|---|---|---|---|
| f = 170.539 | θ = 35° | λ = 785 nm | n = 1.519139 |
| R1M = 578.848 | R1S = −84.3491 | d0 = 55 | d1 = 20 |
| K = −331.908 | | A = 6.081388e-08 | |
| B = −4.244292e-11 | | C = 1.262774e-14 | |
| D = −1.601985e-18 | | | |
| R2M = −103.286 | R2S = −21.4185 | d2 = 168.485 | |
| R2M/f = −0.605641 | | | |
| R2S/f = −0.125593 | | | |

TABLE 23

| | | | |
|---|---|---|---|
| f = 170.482 | θ = 35° | λ = 785 nm | n = 1.519139 |
| R1M = 634.831 | R1S = −93.1213 | d0 = 60 | d1 = 20 |
| K = −498.848 | | A = 9.176716e-08 | |
| B = −5.902301e-11 | | C = 1.646255e-14 | |
| D = −1.943853e-18 | | | |
| R2M = −101.734 | R2S = −22.5547 | d2 = 168.726 | |
| R2M/f = −0.596744 | | | |
| R2S/f = −0.1323 | | | |

TABLE 24

| | | | |
|---|---|---|---|
| f = 170.618 | θ = 35° | λ = 785 nm | n = 1.519139 |
| R1M = 577.428 | R1S = −99.2289 | d0 = 65 | d1 = 20 |
| K = −387.037 | | A = 1.072170e-07 | |
| B = −6.120265e-11 | | C = 1.568870e-14 | |
| D = −1.699745e-18 | | | |
| R2M = −103.385 | R2S = −23.5568 | d2 = 168.718 | |
| R2M/f = −0.605943 | | | |
| R2S/f = −0.138067 | | | |

Embodiments 1 to 24 refer to the case of molding the Fθ lens of plastic but it should be noted that equally good results can be attained even if the lens is manufactured from glass.

As described on the foregoing pages, the one-element scanning lens according to the first aspect of the invention adopts a simple enough shape to assure not only high performance but also ease in design and manufacture.

On account of using this one-element scanning lens which adopts a simple enough shape to assure not only high performance but also ease in design and manufacture, the optical scanner according to the second aspect of the invention can be manufactured in a smaller size and at a lower cost.

What is claimed is:

1. An optical scanner comprising:

collimating means for converting a light beam from a light source to substantially parallel rays;

imaging means for permitting the parallel rays to form a line image elongated in a direction corresponding to a main scanning direction;

deflecting means that has a reflecting surface either in a position where the line image forms or in the neighborhood of said position and which deflects the incident light beam at a constant angular velocity in the direction corresponding to the main scanning direction; and a scanning lens consisting essentially of a single scanning lens element that is positioned between said deflecting means and a scanning surface, a lens surface directed toward said deflecting means being such that it has a rotating axis that is located in a deflecting plane formed by the principal rays of light beam defected by said deflecting means and which crosses the optical axis of said scanning lens at right angles, wherein a curve the lens surface forms by crossing the deflecting plane is convex toward said deflecting means in the neighborhood of the optical axis and wherein an arc of a circle the lens surface forms by crossing a plane crossing the deflecting plane at right angles is formed of an aspheric surface convex toward the scanning surface, and a lens surface directed toward the scanning surface being such that it has a rotating axis that is located in the plane crossing the deflecting plane at right angles and which crosses the optical axis at right angles and wherein arcs of circles the lens surface forms by crossing the deflecting plane and the plane crossing the deflecting plane at right angles are formed of a toric surface convex toward the scanning surface.

2. An optical scanner comprising:

collimating means for converting a light beam from a light source to substantially parallel rays;

imaging means for permitting the parallel rays to form a line image elongated in a direction corresponding to a main scanning direction;

deflecting means that has a reflecting surface either in a position where the line image forms or in the neighborhood of said position and which deflects the incident light beam at a constant angular velocity in the direction corresponding to the main scanning direction; and a single scanning lens element that is positioned between said deflecting means and a scanning surface, a lens surface directed toward said deflecting means being such that it has a rotating axis that is located in a deflecting plane formed by the principal rays of light beam defected by said deflecting means and which crosses the optical axis of said scanning lens at right angles, wherein a curve the lens surface forms by crossing the deflecting plane is convex toward said deflecting means in the neighborhood of the optical axis, wherein an arc of a circle the lens surface forms by crossing a plane crossing the deflecting plane at right angles is formed of an aspheric surface convex toward the scanning surface, and a lens surface directed toward the scanning surface being such that it has a rotating axis that is located in the plane crossing the deflecting plane at right angles and which crosses the optical axis at right angles, wherein arcs of circles the lens surface forms by crossing the deflecting plane and the plane crossing the deflecting plane at right angles are formed of a toric surface convex toward the scanning surface, and wherein the aspheric lens surface is produced by rotating a curve expressed by the following equation about an axis which is a straight line parallel to a y-axis of an assumed xy plane in the deflecting plane that has as the origin a point of intersection between the optical axis and the lens surface directed toward said deflecting means and which has an x-axis extending along the optical axis:

$$x = y^2/[R1M + \sqrt{R1M^2 - (1+K)y^2}\,] + Ay^4 + By^6 + Cy^8 + Dy^{10}$$

wherein K is a conic constant, and A, B, C and D are aspheric coefficients of higher orders.

3. The optical scanner according to claim 2, wherein said scanning lens element satisfies the following conditions:

$$R1M/R2M < -1$$

$$R1S/R2S > 1$$

$$-0.9 < R2M/f < -0.55$$

$$-0.16 < R2S/f < -0.08$$

where R1M is a near-axis radius of curvature of the aspheric lens surface, R1S is a radius of curvature of an arc of a circle of the aspheric lens surface in the plane crossing the deflecting plane at right angles, R2M is a radius of curvature of an arc of a circle of the toric lens surface in the deflecting plane, R2S is a radius of curvature of an arc of a circle of the toric lens surface in the plane crossing the deflecting plane at right angles, and f is a focal length of said scanning lens in the deflecting plane, provided that the sign of radius of curvature is positive when the curvature is convex in a direction in which the incident light beam is launched and negative when it is convex in a direction in which the incident light beam travels.

* * * * *

UNITED STATES PATENT AND TRADEMARK OFFICE
CERTIFICATE OF CORRECTION

PATENT NO. :    5,757,533
DATED      :    May 26, 1998
INVENTOR(S) :   Akira OTA It is certified that error appears in the above-identified patent and that said Letters Patent is hereby corrected as shown below:

Title Page, Item [73], in the Assignee, "LTD." should read --Ltd.--.

Claim 2, Column 13, line 19, "defected" should read --deflected--.

Signed and Sealed this

Sixteenth Day of March, 1999

Attest:

Q. TODD DICKINSON

Attesting Officer

Acting Commissioner of Patents and Trademarks